US011096043B2

(12) United States Patent
Chatterjee et al.

(10) Patent No.: US 11,096,043 B2
(45) Date of Patent: Aug. 17, 2021

(54) DOWNLINK CONTROL INFORMATION FORMAT FOR ULTRA-RELIABLE PHYSICAL DOWNLINK CONTROL CHANNEL

(71) Applicant: Apple Inc., Cupertino, CA (US)

(72) Inventors: Debdeep Chatterjee, San Jose, CA (US); Fatemeh Hamidi-Sepehr, Santa Clara, CA (US); Sergey Panteleev, Nizhny Novgorod NIZ (RU); Toufiqul Islam, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/409,427

(22) Filed: May 10, 2019

(65) Prior Publication Data

US 2019/0274032 A1   Sep. 5, 2019

Related U.S. Application Data

(63) Continuation-in-part of application No. 16/277,680, filed on Feb. 15, 2019, now Pat. No. 10,912,071.
(Continued)

(51) Int. Cl.
*H04W 8/24* (2009.01)
*H04L 1/00* (2006.01)
(Continued)

(52) U.S. Cl.
CPC .............. *H04W 8/24* (2013.01); *H04L 1/0061* (2013.01); *H04W 8/22* (2013.01); *H04W 24/08* (2013.01);
(Continued)

(58) Field of Classification Search
CPC ..... H04W 8/24; H04W 72/042; H04W 72/14; H04W 76/11; H04W 72/0466; H04W 24/08; H04L 1/0061
See application file for complete search history.

(56) References Cited

U.S. PATENT DOCUMENTS

2014/0247816 A1\* 9/2014 Kim ................... H04W 72/0446
370/336
2018/0343683 A1\* 11/2018 Shao .................... H04W 74/008
(Continued)

OTHER PUBLICATIONS

Parkvall et al, NR: The New 5G Radio Access Technology, IEEE Communications Standards Magazine • Dec. 2017.\*

*Primary Examiner* — Yemane Mesfin
*Assistant Examiner* — Henry Baron
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for determining a capability of a UE to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), where the first DCI format is different from DCI formats 1_0 or 1_1, and the second DCI format is different from DCI formats 0_0 or 0_1. Furthermore, a base station may determine search spaces for monitoring physical downlink control channel (PDCCH) candidates to obtain DCI formats indicated by the base station. Other embodiments may be described and claimed.

25 Claims, 13 Drawing Sheets

Related U.S. Application Data

(60) Provisional application No. 62/670,583, filed on May 11, 2018, provisional application No. 62/673,739, filed on May 18, 2018, provisional application No. 62/710,411, filed on Feb. 16, 2018.

(51) Int. Cl.
  *H04W 24/08* (2009.01)
  *H04W 72/14* (2009.01)
  *H04W 76/11* (2018.01)
  *H04W 72/04* (2009.01)
  *H04W 8/22* (2009.01)

(52) U.S. Cl.
  CPC ..... *H04W 72/042* (2013.01); *H04W 72/0466* (2013.01); *H04W 72/14* (2013.01); *H04W 76/11* (2018.02)

(56) References Cited

U.S. PATENT DOCUMENTS

| | | |
|---|---|---|
| 2019/0045489 A1 | 2/2019 | He et al. |
| 2019/0103953 A1 | 4/2019 | Liao et al. |
| 2019/0104503 A1 | 4/2019 | Niu et al. |
| 2019/0150183 A1 | 5/2019 | Aiba et al. |
| 2019/0174323 A1 | 6/2019 | Go et al. |
| 2019/0182807 A1 | 6/2019 | Panteleev et al. |
| 2019/0223160 A1 | 7/2019 | He et al. |
| 2019/0254110 A1* | 8/2019 | He .......................... H04L 5/005 |
| 2019/0261325 A1 | 8/2019 | Manolakos et al. |
| 2019/0313385 A1* | 10/2019 | Yang ..................... H04L 5/0094 |
| 2019/0327755 A1 | 10/2019 | Xiong et al. |
| 2019/0349935 A1 | 11/2019 | Hussain et al. |
| 2019/0372736 A1 | 12/2019 | Chang et al. |
| 2020/0120545 A1 | 4/2020 | Li et al. |

\* cited by examiner

DOWNLINK CONTROL INFORMATION FORMAT FOR ULTRA-RELIABLE PHYSICAL DOWNLINK CONTROL CHANNEL

CROSS REFERENCE TO RELATED APPLICATION

The present application claims priority from U.S. Provisional Patent Application No. 62/673,739, filed May 18, 2018, and entitled "SUPPORT OF COMPACT DOWNLINK CONTROL INFORMATION FORMAT FOR ULTRA-RELIABLE PHYSICAL DOWNLINK CONTROL CHANNEL," and further claims priority from U.S. Provisional Patent Application No. 62/670,583, filed May 11, 2018, and entitled "SUPPORT OF COMPACT DOWNLINK CONTROL INFORMATION FORMAT FOR ULTRA-RELIABLE PHYSICAL DOWNLINK CONTROL CHANNEL," the entire disclosures of which are hereby incorporated by reference in their entireties. The present application is a continuation-in-part of and claims priority from U.S. patent application Ser. No. 16/277,680, filed Feb. 15, 2019, and entitled "RELIABILITY MECHANISMS FOR PHYSICAL DOWNLINK CONTROL CHANNEL (PDCCH) TRANSMISSIONS IN NEW RADIO (NR) SYSTEMS," which claims priority from U.S. Provisional Patent Application No. 62/710,411, filed Feb. 16, 2018, and entitled "Ultra-Reliable and Low Latency Physical Downlink Control Channel (PDCCH) Transmissions in New Radio (NR) Systems," the entire disclosures of which are hereby incorporated by references in their entireties.

FIELD

Various embodiments generally may relate to the field of wireless communications.

BACKGROUND

Mobile communication has evolved significantly from early voice systems to today's highly sophisticated integrated communication platform. The next generation wireless communication system, which may be referred to as 5G or new radio (NR), may provide access to information in sharing of data anywhere, any time by various users and applications. NR is expected to be a unified network/system that meets vastly different and sometimes conflicting performance dimensions and services. Such diverse multi-dimensional requirements may be driven by different services and applications. In general, NR will evolve based on $3^{rd}$ Generation Partnership Project (3GPP) LTE-Advanced with additional potential new Radio Access Technologies (RATs) to improve wireless connectivity solutions. NR may enable ubiquitous wireless connections the deliver fast and rich content in services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

Figure 1:
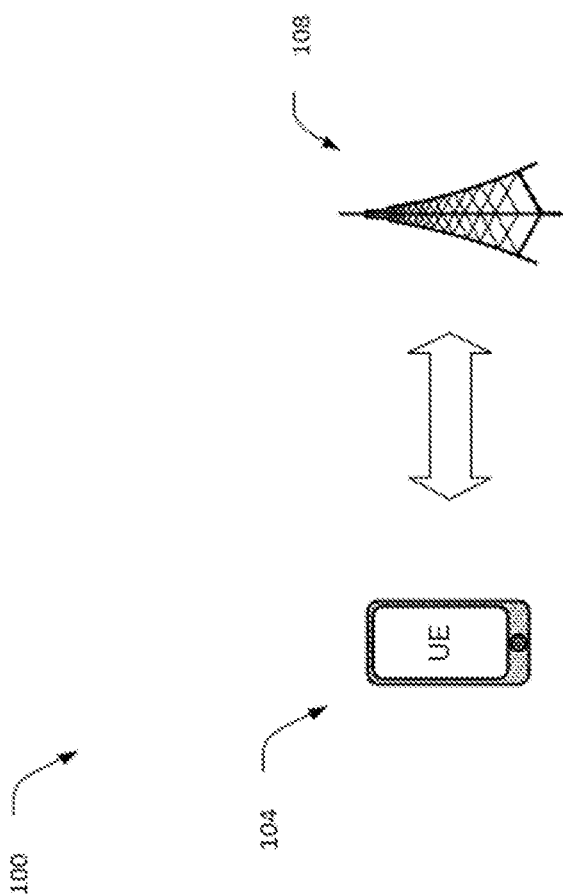
FIG. 1 illustrates a simplified network in accordance with some embodiments.

FIG. 1 illustrates a simplified network 100 in accordance with some embodiments. The network 100 may include a user equipment (UE) 104 communicatively coupled with an access node or a base station 108. The UE 104 and access node or base station 108 may correspond to and be substantially interchangeable with like-named elements described with respect to FIGS. 5-13.

In embodiments, the network 100 may be a 5G NR system. 5G NR system uses physical downlink control channel (PDCCH) between the UE 104 and the base station 108 to perform physical layer control functions such as scheduling the downlink (DL) broadcast and DL/uplink (UL) unicast data transmission, and signaling various triggers for aperiodic and periodic transmission/reception. However, various design elements of NR make NR PDCCH different from the PDCCH or enhance PDCCH (EPDCCH) designs in LTE. NR supports a large variety of frequency bands ranging from sub-GHz to 100 GHz. Due to path loss and channel conditions corresponding to different transmission environments, it may be desirable to ensure good coverage for NR PDCCH transmission, particularly in mmWave bands where narrow beamforming is typically employed to achieve coverage. NR PDCCH supports various frequency and spatial diversity-based transmission schemes. NR PDCCH is also designed to support link adaptation via use of different aggregation levels (ALs). For the description below, NR PDCCH may be simply referred to as PDCCH.

Although the resource allocation unit in NR is similar to LTE, a few additional units are introduced in NR in association with the control channels, e.g., PDCCH, as discussed in the following. Those additional units have not been used in the PDCCH or EPDCCH designs in LTE.

A resource element (RE), is the smallest unit of the resource grid made up of one subcarrier in frequency domain and one OFDM symbol in time domain. A PDCCH corresponds to a set of resource elements carrying DL control information.

An NR control-channel element (CCE) includes 6 resource-element groups (REGs) where a resource-element group equals one resource block (12 resource element in frequency domain) during one OFDM symbol. Various modulation schemes, e.g., Quadrature Phase Shift Keying (QPSK), may be used for NR PDCCH. The CCE size is designed such that at least one UE-specific DL control information (DCI) can be transmitted within one CCE (with code rates not close to 1).

NR REG bundles are defined to include 2, 3, or 6 REGs, and play a two-fold role: they determine the precoder cycling granularity (which affects the channel estimation performance), as well as the interleaving unit for the distributed REG mapping.

An NR PDCCH candidate includes of a set of CCEs, for example, 1, 2, 4, 8, or 16, corresponding to ALs 1, 2, 4, 8, 16, respectively. A control search space (SS) includes of a set of NR PDCCH candidates, and closely associates with the AL(s), the number of decoding candidates for each AL, and the set of CCEs for each decoding candidate. A SS in NR may be associated with a single control resource set.

A control resource set (CORESET) is defined as a set of REGs under a given numerology (for example, sub-carrier spacing). Particularly, in the frequency domain, a CORESET is a set of contiguous or distributed physical resource blocks (PRBs) configured using a 6-PRB granularity, within which the UE attempts to blindly decode the DCI. There is no restriction on the maximum number of segments for a given CORESET. In time domain, a CORESET spans 1, 2, or 3 contiguous OFDM symbol, and the exact duration is configured to the UE by higher layer such as system information (SI) or UE-specific RRC depending on whether it is common CORESET or UE-specific CORESET. Compared to LTE PDCCH, the configurability of CORESETs enable efficient resource sharing between DL control and shared channels, thereby allowing for efficient Layer 1 signaling overhead management.

One of the factors that can impact the time-duration of a CORESET, is the bandwidth (BW) of the corresponding carrier, such that more control symbols may be allowed for smaller bandwidths. For example, assuming a CORESET includes of 48 PRBs with 2 OFDM symbols, there are 16 CCEs that could accommodate up to two PDCCH candidates at AL 8 or a single candidate at AL 16. Furthermore, there can be multiple CORESETs inside a system bandwidth, so the CORESET may not fully occupy the whole system bandwidth in frequency domain, or DL power boosting could be applied to CORESETs that occupy narrow frequency regions within the carrier BW, depending on targeted coverage. In that case, 1 or 2 OFDM symbols may not be sufficient. One-symbol CORESET offers benefits from the perspective of latency and control overhead adjustments especially when there are not many UEs in the cell or when the coverage target is limited (e.g., small cell deployments). The maximum CORESET duration that may be configured in a cell is configured implicitly via Physical Broadcast CHannel (PBCH).

A UE may be configured with one or more CORESETs (using UE-specific or common higher-layer signaling) with a maximum of three CORESETs per configured DL Bandwidth Part (BWP). Limiting the maximum number of CORESETs is beneficial for enabling more practical RRC signaling and help enable better UE dimensioning. Note that, the scheduling flexibility may not be impacted by limiting the maximum number of CORESETs since different monitoring occasions can be configured flexibly even with association to the same CORESET. Here, it is important to note that the concept of PDCCH monitoring periodicity is defined per search space set and is not configured at the CORESET-level. Every configured search space with a certain monitoring periodicity (in terms of slots and starting symbols within the monitored slots) is associated with a CORESET.

In order to support ultra-reliable low-latency communication (URLLC) services which target 1 ms latency and 99.999% reliability, control and shared channels may employ advanced transmission schemes which maximize diversity and energy within a very short transmission interval. In that sense, reliability of physical downlink control channel (PDCCH) is critical to provide both downlink (DL) and uplink (UL) operation. Recently, support of 16 control channel elements (CCE) per decoding candidate was agreed that brings improved coverage for the considered enhanced mobile broadband (eMBB) use cases. However, in order to efficiently support ultra-reliable and low latency communications (URLLC) requirements, further enhancements to NR PDCCH and downlink control information (DCI) format designs are expected.

PDCCH Reliability and Coverage Enhancement Via Compact DCI Formats

A further means to improve the PDCCH reliability, coverage, and latency performance is by reducing the amount of DCI payload that is carried by the PDCCH for scheduling of PDSCH or PUSCH.

Figure 2:
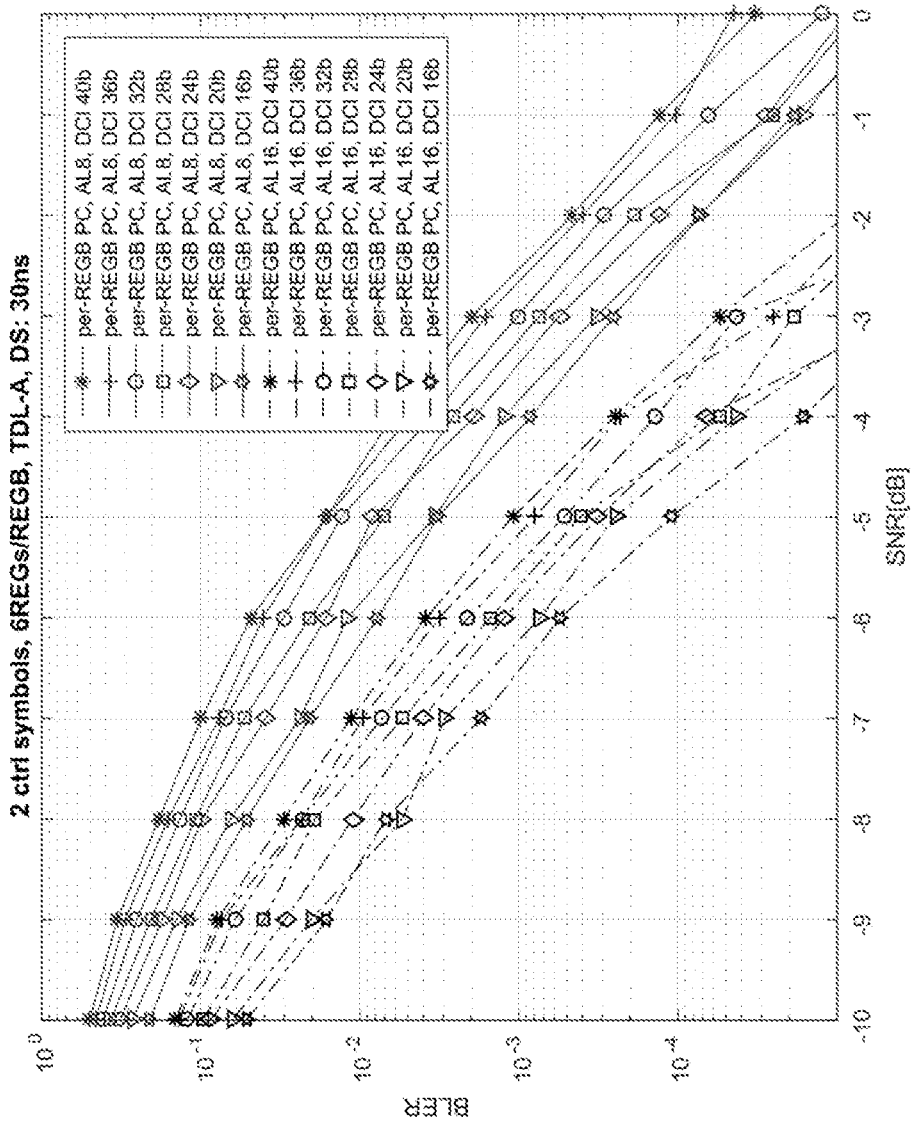
FIG. 2 illustrates results of signal to noise ratio (SNR) improvements with respect to downlink control information (DCI) payload sizes, in accordance with some embodiments.

FIG. 2 illustrates results of SNR improvements with respect to DCI payload sizes. As shown in FIG. 2, there may be about 1 to 1.5 dB of SNR improvement achieved if the DCI payload size is reduced by up to around 20 bits.

Towards reducing DCI payload size, one approach may be to consider the fallback DCI formats, for example, DCI formats 0_0 and 1_0 (for PUSCH and PDSCH scheduling respectively) as a starting point, and reduce the DCI payload further by considering removal and/or bit-width reduction of various DCI fields based on assumption of pre-configuration (via higher layers) and/or some scheduling flexibility reduction. In another approach, the non-fallback DCI formats may be considered as the starting point and various bit-fields could be removed or their bit-widths reduced based on the assumption of pre-configuration (via higher layers) and/or some scheduling flexibility reduction. Note that, for both options, new DCI formats may be defined based on the above principles.

Embodiments of this disclosure may be generally directed to mechanisms related to optimization and re-interpretation of the fields in the existing NR DCI formats for URLLC applications, as well as the introduction of a new compact or size-matched DCI format or a new size-matched DCI format for DL and UL scheduling. Embodiments may include a potential new compact or size-matched DCI format or a new size-matched DCI format that may be referred to as DCI format 0_2 and 1_2 for UL and DL scheduling respectively. Specifically, embodiments herein may present methods of configuration of the new DCI format for PDCCH monitoring and adaptation to certain Layer1 signaling approaches compared to the use of the DCI formats 0_0/0_1 and 1_0/1_1 for DL and UL scheduling respectively.

In embodiments, means are presented for facilitating operation with PDCCH with high reliability may optimize, re-interpret, or redesign the DCI payload to introduce new fields enabling the URLLC required features, as well as optimizing the exiting fields to better suit the characteristics of URLLC traffic and obtain better link performance. This may result in a new DCI format that may be a new compact or size-matched DCI format or a new size-matched DCI format such that: New compact or size-matched DCI format: Has DCI payload size lower than the DCI formats 0_0/1_0 for a given UL and/or DL BWP sizes; and New size-matched DCI format: Has DCI payload size that is matched to DCI format 0_1 for UL scheduling and matched to DCI format 1_1 for DL scheduling—in this case, these two new DL and UL DCI formats may not be size-matched between DL and UL formats.

Other embodiments may be directed to mechanisms for optimizing DCI formats 0_0/0_1 and 1_0/1_1, as well as for configuring and using a new compact or size-matched DCI format for DL and UL scheduling, considering URLLC use cases.

The new compact or size-matched DCI formats are referred to as DCI formats 0_2 and 1_2 for UL and DL scheduling in a cell respectively.

In some embodiments, the new DCI formats 0_2/1_2 are only introduced to enable new features and their corresponding signaling. If no new DCI field is added, the existing fallback/non-fallback formats are used and their corresponding fields may be further optimized and re-interpreted. In another embodiment, new fields may be added to DCI format 0_1 or 1_1 or both, the presence of which fields and their bit-widths may depend on higher layer configuration of related features.

Embodiments that May be Directed to Configuration and Monitoring of DCI Formats 0_2/1_2.

In embodiments, the new DCI format is defined as an optional UE capability. In embodiments, for a UE supporting monitoring of the new compact or size-matched DCI formats, a UE may be configured using UE-specific higher layer signaling with possible monitoring of DCI formats 0_2 and 1_2 first, before it may be configured to monitor for these new compact or size-matched DCI formats as part of search space set configuration. Note that the DL and UL DCI formats may be assumed as size-matched when in a configured search space set.

In embodiments, for a UE supporting monitoring of the new compact or size-matched DCI formats, the UE may be directly configured to monitor for the new compact or size-matched DCI format as part of the search space set configuration via UE-specific higher layer signaling, without a need to be first configured with separate UE-specific signaling.

Specifically, different approaches could be considered depending on whether the new compact or size-matched DCI format may be configured for monitoring only in a UE-specific search space (USS) or a common search space (CSS).

In an example, the compact or size-matched DCI formats may only be configured for monitoring in a PDCCH UE-specific search space (USS).

In another example, the compact or size-matched DCI formats may be configured for monitoring in a PDCCH UE-specific search space or in a common search space (CSS). Further, in an example, for configuration of monitoring in a common search space, the configuration of the search space set may be provided to the UE via UE-specific signaling, and thus, the new compact or size-matched DCI format in this example may be configured for monitoring in Type 3 PDCCH CSS as defined in TS 38.23 v. 15.1, in addition to PDCCH USS.

In another example, the UE may be configured with monitoring of either of DCI format 0_2 or format 1_2 for UL or DL scheduling respectively in a configured search space set, and for scheduling of the other link direction (for example, DL or UL respectively), the corresponding "fallback DCI format", for example, DCI format 1_0 and 0_0 for DL and UL scheduling respectively, is assumed, and these two DCI formats are size-matched in a configured search space set. In this case, the header field for format identification within one of DCI formats may indicate between DCI formats 0_0/0_1 and 1_2, or formats 0_2 and 1_0/1_1.

In an embodiment, the compact or size-matched DCI formats 0_2/1_2 are transmitted with cyclical redundancy check (CRC) scrambled with either C-radio network temporary identifier (RNTI) or CS-RNTI or other configurable RNTI.

Embodiments that May be Directed to Monitoring of Compact or Size-Matched DCI Format in Common Search Spaces If the new compact or size-matched DCI format is introduced and configured for monitoring in a PDCCH CSS, according to embodiments, a new higher layer parameter may be used as part of the search space set configuration, that may be conveyed via UE-specific RRC signaling, to indicate whether to monitor for DCI formats 0_0/1_0 or DCI formats 0_2/1_2 with CRC scrambled with C-RNTI or CS-RNTI or other configurable RNTI. This approach can avoid increase in UE blind decoding (BD) efforts or increase in the number of different DCI format sizes scrambled with C-RNTI or CS-RNTI, when configured for monitoring for compact or size-matched DCI formats. This is achieved by effectively using the DCI formats 0_2/1_2 for supporting fallback operations, instead of DCI formats 0_0/1_0.

Additionally, if DCI formats 2_2 and 2_3 are configured to be monitored in the same search space set, their payload sizes may be matched, using zero padding as necessary, to the size corresponding to DCI format sizes 0_0/1_0 or the size corresponding to DCI format sizes 0_2/1_2 respectively.

Embodiments it May be Directed to Monitoring of Compact or Size-Matched DCI Format in UE-Specific Search Spaces If the compact or size-matched DCI format is introduced and configured for monitoring in a PDCCH USS, in embodiments, the higher layer field USS-DCI-format may be extended to 2-bit field to indicate choice between DCI formats: 0_0/1_0, 0_1 & 1_1 (note: DCI formats 0_1 and 1_1 may not have the same size), or 0_2/1_2 (compact or size-matched DCI format) to be monitored.

This approach can help avoid increase in BD, which may be blind decoding, efforts and number of different DCI format sizes when CRC is scrambled with C-RNTI or CS-RNTI.

In embodiments, the last code-point of the extended field USS-DCI-format may be used to indicate monitoring of 0_2/1_2 and 0_1 and 1_1 (the "non-fallback formats" for DL and UL scheduling), as long as the DCI size budget is not violated. Note that the current DCI size budget is defined as no more than 3 DCI format sizes for PDCCH with CRC scrambled with C-RNTI or CS-RNTI and one additional DCI format size for any other valid DCI format/RNTI combination. In embodiments, the DCI size budget is extended for UEs supporting DCI formats 0_2/1_2 to maximum of four DCI format sizes for PDCCH with CRC scrambled with C-RNTI or CS-RNTI and one additional DCI format size for other format/RNTI combination.

For the above embodiments, in other examples, a separate higher layer configured parameter as part of the search space set configuration may be used to indicate the choice of DCI formats to be monitored in the USS, instead of extending the existing parameter USS-DCI-format.

In various embodiments, when the new format is introduced, the UE can be configured as part of the search space set configuration in PDCCH-Configuration, to monitor in the UE-SS between non-fallback DCI formats, and new DCI formats.

In various embodiments, it is possible that the new DCI format introduced, is size-matched to the existing non-fallback format to avoid introducing a new DCI size, if both versions of non-fallback formats (for example, DCI formats 0_1/1_1 and 0_2/1_2) are configured to be monitored in a PDCCH search space set. In an example, if the UE is expected to monitor for both non-fallback DCI formats, and new DCI format, identification between these two formats is defined by introducing new RNTIs for URLLC or a new header bit field or extending the existing header bit-field that would apply to both sets of DCI formats 0_1/1_1 and 0_2/1_2.

In various embodiments, indication of the DCI format between non-fallback and new DCI formats to the UE is done by means of BWP indication field, configuring two BWPs (potentially of same characteristics) each associated with one of size-matched DCI formats. The UE monitors only one of the formats in each BWP. The RRC configuration then refers to the configured active BWP, meaning that each of the higher layer configurations are specific to BWP. Once the UE is pointed to a particular BWP, the corresponding RRC configuration reveals the set of enabled features/capabilities for that BWP, and the rest of DCI fields are interpreted accordingly.

In the above, the use of CS-RNTI may indicate that, when in the same search space set, for DCI transmitted using PDCCH with CRC scrambled with CS-RNTI (for Configured Grant-based (CG) PUSCH or Semi-Persistently Scheduled (SPS) PDSCH), the DCI format may correspond to the DCI format configured for monitoring by the higher layer parameter, viz., either of: compact or size-matched DCI formats (0_2/1_2), the fallback DCI formats (0_0/1_0), or the non-fallback DCI formats (0_1/1_1), or for both compact and non-fallback formats.

If simultaneous monitoring of DCI formats 0_1/1_1 and 0_2/1_2 are configured in a search space set, in another example, the DCI format to be monitored with CRC scrambled with CS-RNTI may be additionally indicated between the formats 0_1/1_1 and 0_2/1_2 via a separate higher layer parameter. Alternatively, if simultaneous monitoring of DCI formats 0_1/1_1 and 0_2/1_2 are configured in a search space set, the DCI format to be monitored with CRC scrambled with CS-RNTI is the DCI format 0_2/1_2 by default.

In embodiments, the minimum requirements on BD efforts per slot and the number of CCEs for channel estimation during a slot duration are the same, irrespective of support and configuration of monitoring of compact or size-matched DCI format. Note that although some of the following embodiments are described with respect to the requirements on the numbers of BDs and numbers of non-overlapping CCEs for channel estimation, the embodiments may apply to either or both of these two requirements.

In other embodiments, a UE capability corresponding to increased numbers of BDs and CCEs for channel estimation per slot may be defined for PDCCH monitoring case 2 (e.g., when PDCCH monitoring is configured with monitoring periodicity less than slot duration).

Further, in an extension of such embodiments, the numbers of BDs and CCEs are defined per slot or per half-slot, with the total numbers of BDs and CCEs per slot being larger than the numbers cited above for Case 2, however, the number of BDs and CCEs over any span of 'p' consecutive OFDM symbols may not increase the corresponding values defined for Case 1-1 (that are equal to the numbers for Case 2 as currently specified) for the respective subcarrier spacing (SCS) value, with p equal to one fixed value from the set $\{3, \ldots, 7\}$. In an example, p=3.

Further, if a UE is configured to monitor both DCI formats 0_1/1_1 and 0_2/1_2 in a PDCCH USS, PDCCH candidate dropping rules may be defined in an example such that the PDCCH candidates corresponding to DCI formats 0_1/1_1 may be selected for dropping over candidates corresponding to DCI formats 0_2/1_2 in case either or both of the minimum requirements on number of BD attempts or number of CCEs in a slot is/are exceeded.

Embodiments Directed to Adaptations to Certain Bit-Fields for New DCI Formats 0_2/1_2 or Existing Fallback/Non-Fallback Formats Various embodiments may be directed to realize reduced or entire removal of bit-field sizes in fallback/non-fallback formats.

Embodiments herein may be directed to specific fields, such as frequency and time domain resource allocation (RA), and Modulation and Coding Scheme (MCS) indication.

Embodiments Directed to Frequency-Domain RA:

The frequency domain RA following Type 1 RA may be adapted to schedule using a granularity of K>1 PRBs. The corresponding number of bits in the frequency domain RA field in the DCI format is given by ceil(log_2(ceil($N_{RB}^{XL,BWP}$/K)*(ceil($N_{RB}^{XL,BWP}$/K)+1)/2)), with XL=DL or UL.

In such a case, in embodiments, the value of K may be set separately for DL and UL as a new higher layer parameter via UE-specific radio resource control (RRC) signaling on a per-bandwidth part (BWP) basis. In alternative embodiments, the value of K could be same as the Resource Block Group (RBG) size corresponding to Configuration #2 as specified for a given BWP size (see table below). In alternative embodiments, the value of K could be configured to use RBG sizes for the BWP from either RBG configuration #1 or #2.

TABLE 5.1.2.2.1-1

Nominal RBG size P

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

Further, in an example, the indexing of the K-PRB contiguous frequency resources within a BWP can be such that the lowest PRB index of the BWP marks the first K-PRB set, with the last PRB-set possibly having fewer than K PRBs. Such an allocation approach may require ceil(log_2 (ceil($N_{RB}^{XL,BWP}$/K)*(ceil($N_{RB}^{XL,BWP}$/K)+1)/2)) bits as mentioned above.

In another example, the indexing of the K-PRB contiguous frequency resources within a BWP can be similar to the approach used for indexing of RBGs within a BWP. That is, the total number of K-PRB sets ($N_{K-PRB}$) for a DL or UL carrier BWP i of size $N_{BWP,i}^{size}$ PRBs is given by $N_{K-PRB}$ ceil (($N_{BWP,i}^{size}$+($N_{BWP,i}^{start}$ mod K))/K), where the size of the first K-PRB set is given by (K−$N_{BWP,i}^{start}$ mod K), the size of last RBG is given by ($N_{BWP,i}^{start}$+$N_{BWP,i}^{size}$) mod K, if ($N_{BWP,i}^{start}$+$N_{BWP,i}^{size}$) mod K>0 and equals K otherwise, the size of all other K-PRB sets is K.

The latter approach may require more up to one more bit compared to the first approach, but can offer better alignment with other RA types (especially RA type 0) if used in the same BWP or in other overlapped BWPs.

Embodiments Directed to Time-Domain RA:

In embodiments, only PDSCH and PUSCH mapping type B may be used for time-domain scheduling when using DCI formats 1_2 and 02 respectively. In embodiments, only mapping type B may be used for PUSCH scheduling using DCI format 02, but both mapping types A and B are supported for PDSCH when scheduled using DCI format 1_2. The latter offers addition flexibility for PDSCH scheduling since PDSCH with mapping type B only supports PDSCH durations of 2, 4, and 7 symbols.

In embodiments, for scheduling of PDSCH, the maximum duration of the scheduled PDSCH is indicated at least in part based on the maximum Aggregation Level (AL) or maximum Repetition Level (RL) defined for the search space set where the scheduling PDCCH is detected, or, alternatively, based on the AL or RL used for PDCCH candidate used to transmit the scheduling DCI.

In embodiments, the slot offset value between PDCCH and scheduled PDSCH, K0, may be indicated from a set of values that is restricted to a lower maximum value than when scheduling using DCI formats 1_0 or 1_1 (specified max of 32). For instance, the possible set of K0 values can be specified as fixed to {0}, or {0, 1} or {0, 1, 2} or {0, 1, 2, 3}, etc., when scheduled using DCI format 1_2. In an example, the set of possible values that a UE may be configured with by higher layers for K0 is not restricted, but it may be specified that the UE does not expect to receive a time-domain resource allocation indicating K0 value beyond the set of values as in the examples above.

Similarly, in embodiments, the slot offset value between PDCCH and scheduled PUSCH, K2, may be indicated from a set of values that is restricted to a lower maximum value than when scheduling using DCI formats 0_0 or 0_1 (specified max of 32). For instance, the possible set of K2 values can be specified as {0, 1, 2, 3, 4} or {0, 1, 2}, etc., when scheduled using DCI format 0_2. In an example, the set of possible values that a UE may be configured with by higher layers for K2 is not restricted, but it is specified that the UE does not expect to receive a time-domain resource allocation indicating K2 value beyond the set of values as in the examples above.

The above restrictions on the maximum values of K0 and K2 are motivated by the aim to reduce possible signaling combinations and the expected latency-sensitive use cases for DCI formats 02/1_2 precluding use of large values of K0 or K2.

In embodiments, the set of possible K0 or K2 values are defined as a function of the subcarrier spacing (SCS).

In embodiments, only certain combinations of the values of K0/K2, Start and Length Indicator Value (SLIV), and the PDSCH/PUSCH mapping type may be configured to the UE to construct the different rows of the time-domain resource allocation table that would be used by the time-domain resource allocation field in the DCI formats 0_2/1_2 respectively.

In legacy specifications, a UE may be configured with slot aggregation factor semi-statically via higher layers for PDSCH or PUSCH. In such cases, the scheduled PDSCH/PUSCH are expected to be repeated according to the indicated slot aggregation factor.

However, this may not provide sufficiently flexible link adaptation capability for URLLC use cases. To overcome this restriction, in embodiments, based on UE-specific configuration of dynamically indicated numbers of repetitions of the PDSCH/PUSCH, a field in the DCI may be used to dynamically indicate the number of repetitions. The set of candidate values may be pre-defined or configured via UE-specific signaling. Such configurations can be separate for DL and UL.

The new bit-field could be configured for new compact or size-matched DCI formats 0_2/1_2 (if introduced) and/or to non-fallback DCI formats 0_1/1_1. If introduced to DCI formats 0_2/1_2, the new field may be present only when the DCI format is monitored in the PDCCH USS.

In embodiments, for scheduling of PDSCH, instead of explicit indication of the number of repetitions used for the scheduled PDSCH, the information is indicated at least in part based on the maximum Aggregation Level (AL) or maximum Repetition Level (RL) defined for the search space set where the scheduling PDCCH is detected, or, alternatively, based on the AL or RL used for PDCCH candidate used to transmit the scheduling DCI.

Embodiments that May be Directed to MCS Field:

In embodiments, the MCS field for scheduling PDSCH or PUSCH in a compact or size-matched DCI format 1_2 or 0_2 respectively and/or in non-fallback DCI formats 1_1 and 0_1 respectively can be reduced from 5 bit to 4 or 3 bit. The mapping of 32 entries to 16 or 8 entries respectively for 4 or 3 bit tables may be either predefined or be semi-statically configurable via UE-specific (re)configuration RRC message.

The mapping of 5 bit tables to smaller tables can be realized using combinatorial index approach similar to the one used for EPDCCH or SPDCCH PRB-pair resource set configuration. That is, a combinatorial index r corresponding to the MCS index from 5-bit$a$ table $\{k_i\}_{i=0}^{M}$, ($1 \leq k_i \leq M_0$, $k_i < k_{i+1}$) and given by equation $$\sum_{i=0}^{M-1} \binom{M_0 - k_i}{M - k_i},$$

where $M_0$ is the number of MCS entries in a 5-bit table defined for 64QAM or 256QAM for PDSCH or PUSCH, $M_0$ is the number of MCS entries in a compressed MCS table derived as $M=2^L$, where L is the number of bits configured for the compressed MCS index indication, and M is configured by higher layers and $$\binom{x}{y} = \begin{cases} \binom{x}{y} & x \geq y \\ 0 & x < y \end{cases}$$

is the extended binomial coefficient, resulting in unique label $$r \in \left\{0, \ldots, \binom{M_0}{M} - 1\right\}.$$

Addition of certain bit-fields to new DCI formats 0_2/1_2 or DCI formats 0_1/1_1 when configured.

New DCI fields can be added to the new or existing DCI formats, in order to enable different URLLC-related functionalities.

In an embodiment, DL Pre-emption Indication (PI) is included in DCI formats 1_1 or DCI format 1_2, to indicate whether the current PDSCH assignment may be pre-empted or not.

Figure 3:
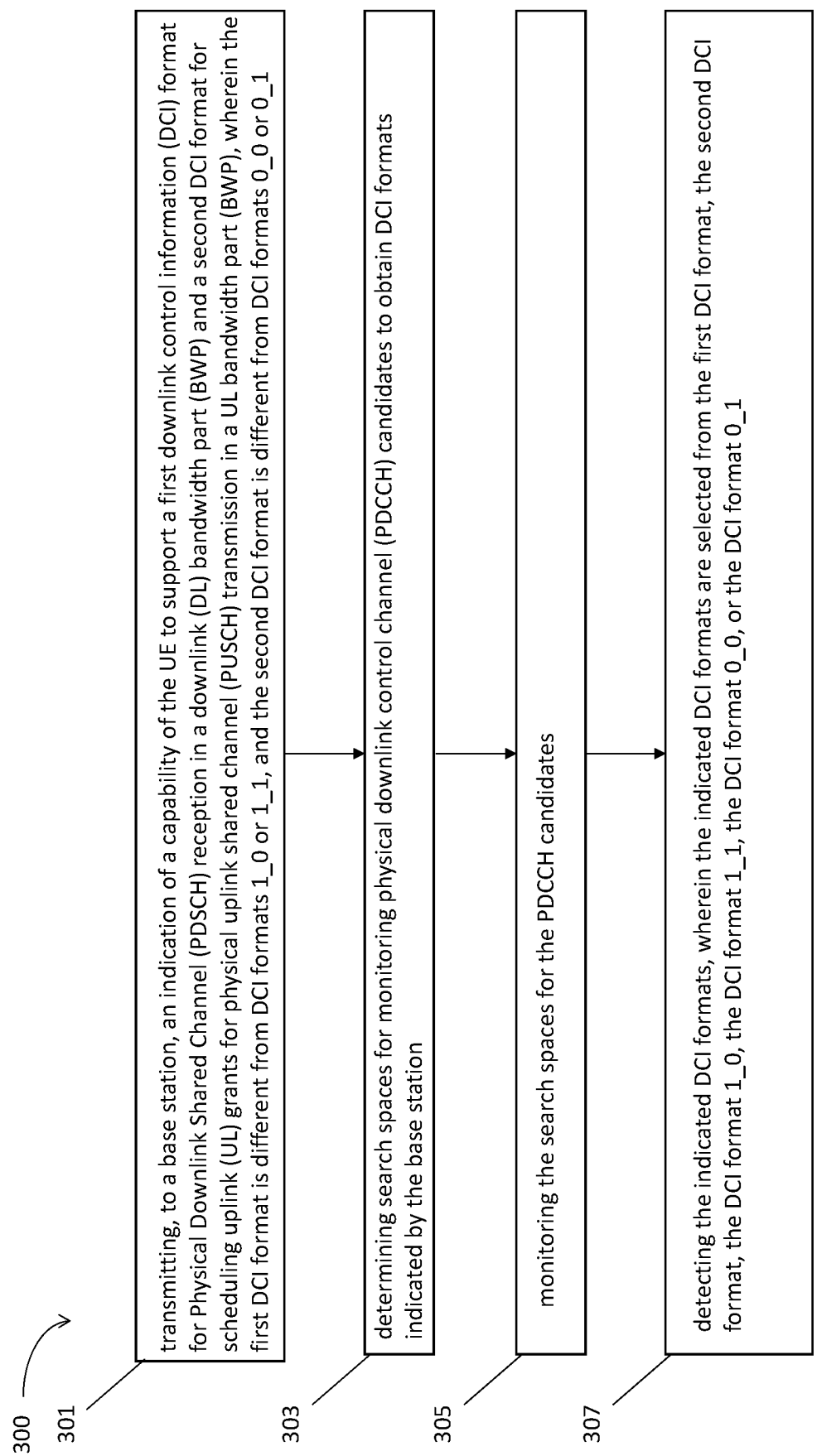
FIG. 3 illustrates operation flows/algorithmic structures for a user equipment (UE) to monitor physical downlink control channel (PDCCH) to obtain the downlink control information in accordance with some embodiments.

FIG. 3 illustrates operation flows/algorithmic structures for a user equipment (UE) to monitor physical downlink control channel (PDCCH) to obtain the downlink control information in accordance with some embodiments. In particular, FIG. 3 illustrates an operation flow/algorithmic structure 300 that may be implemented by a device, or components thereof, as described herein with respect to any one of FIGS. 5-13.

The operation flow/algorithmic structure 300 may include, at 301, transmitting, to a base station, an indication of a capability of the UE to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), where the first DCI format is different from DCI formats 1_0 or 1_1, and the second DCI format is different from DCI formats 0_0 or 0_1. In some embodiments, the transmitting to the base station an indication of a capability of the UE may be performed by network controller circuitry in, for example, radio front end module 715 or 815, or network controller circuitry 735, or antenna 920.

The operation flow/algorithmic structure 300 may further include, at 303, determining search spaces for monitoring physical downlink control channel (PDCCH) candidates to obtain DCI formats indicated by the base station. In some embodiments, the determining the search spaces may be performed by processing circuitry in, for example, application circuitry 705 or 805, or baseband circuitry 710 or 810.

The operation flow/algorithmic structure 300 may further include, at 305, monitoring the search spaces for the PDCCH candidates. In some embodiments, the monitoring the search spaces for the PDCCH candidates may be performed by processing circuitry in, for example, application circuitry 705 or 805, or baseband circuitry 710 or 810.

The operation flow/algorithmic structure 300 may further include, at 307, detecting the indicated DCI formats, wherein the indicated DCI formats are selected from the first DCI format, the second DCI format, the DCI format 1_0, the DCI format 1_1, the DCI format 0_0, or the DCI format 0_1. In some embodiments, the detecting the indicated DCI formats may be performed by processing circuitry in, for example, application circuitry 705 or 805, or baseband circuitry 710 or 810.

Figure 4:
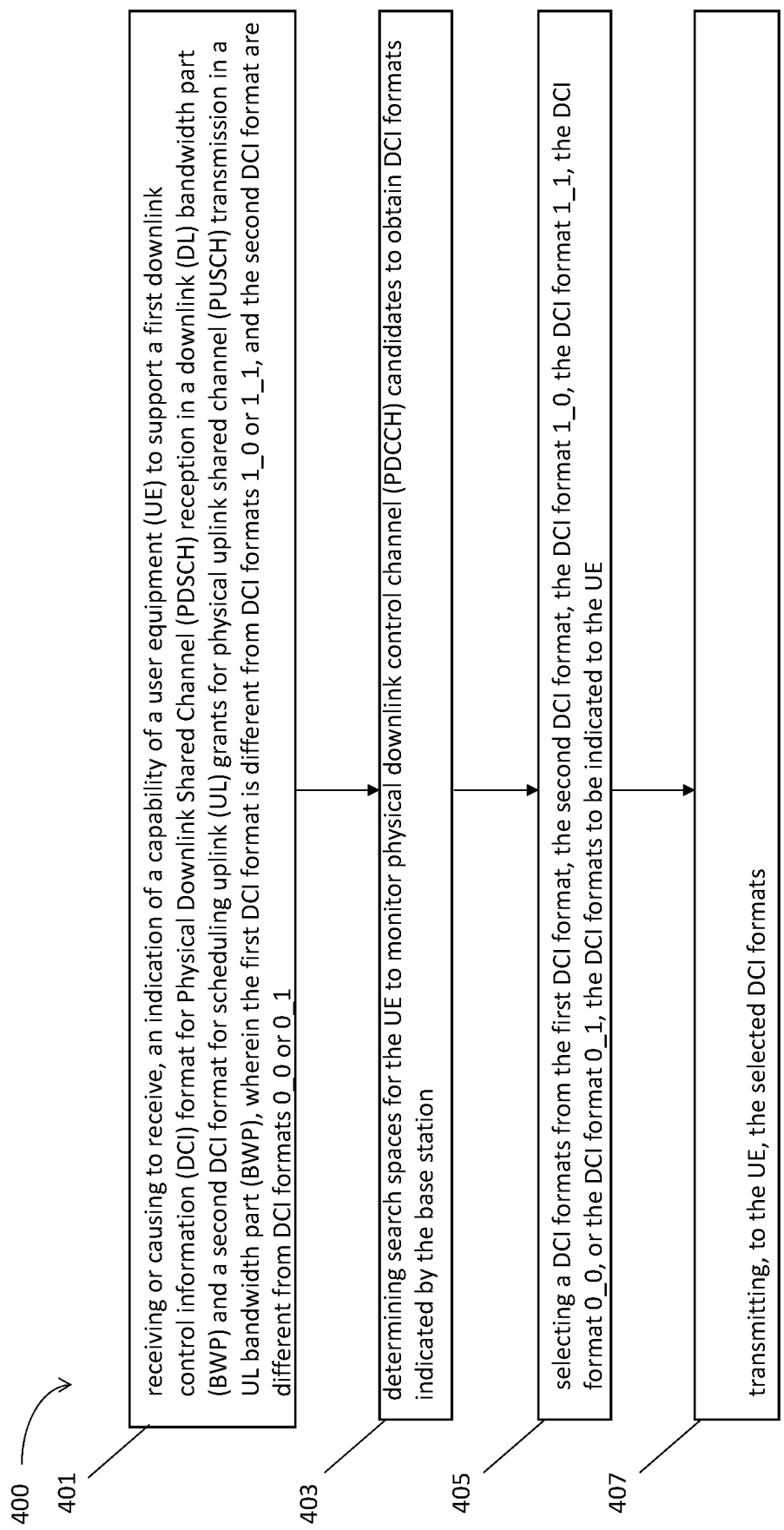
FIG. 4 illustrates operation flows/algorithmic structures for a base station to transmit downlink control information by physical downlink control channel (PDCCH) in accordance with some embodiments.

FIG. 4 illustrates operation flows/algorithmic structures for a base station to transmit downlink control information by physical downlink control channel (PDCCH) in accordance with some embodiments. In particular, FIG. 4 illustrates an operation flow/algorithmic structure 400 that may be implemented by a device, or components thereof, as described herein with respect to any one of FIGS. 5-13.

The operation flow/algorithmic structure 400 may include, at 401, receiving or causing to receive, an indication of a capability of a user equipment (UE) to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), where the first DCI format is different from DCI formats 1_0 or 1_1, and the second DCI format are different from DCI formats 0_0 or 0_1. In some embodiments, the receiving or causing to receive, an indication of a capability of the UE may be performed by network controller circuitry in, for example, radio front end module 715 or 815, or network controller circuitry 735, or antenna 920.

The operation flow/algorithmic structure 400 may further include, at 403, determining search spaces for the UE to monitor physical downlink control channel (PDCCH) candidates to obtain DCI formats indicated by the base station. In some embodiments, the determining the search spaces may be performed by processing circuitry in, for example, application circuitry 705 or 805, or baseband circuitry 710 or 810.

The operation flow/algorithmic structure 400 may further include, at 405, selecting a DCI formats from the first DCI format, the second DCI format, the DCI format 1_0, the DCI format 1_1, the DCI format 0_0, or the DCI format 0_1, the DCI formats to be indicated to the UE. In some embodiments, the selecting a DCI formats may be performed by processing circuitry in, for example, application circuitry 705 or 805, or baseband circuitry 710 or 810.

The operation flow/algorithmic structure 400 may further include, at 407, transmitting, to the UE, the selected DCI formats. In some embodiments, the detecting the indicated DCI formats may be performed by network controller circuitry in, for example, radio front end module 715 or 815, or network controller circuitry 735, or antenna 920.

Figure 5:
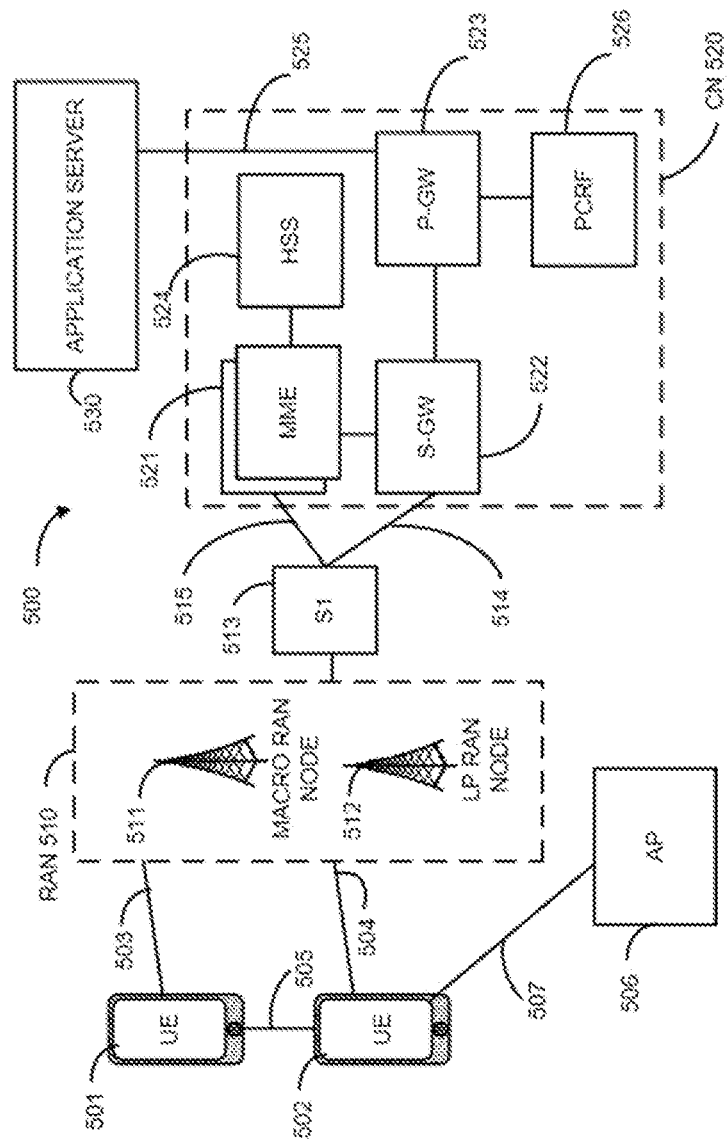
FIG. 5 illustrates an architecture of a system of a network in accordance with some embodiments.

FIG. 5 illustrates an architecture of a system 500 of a network in accordance with some embodiments. The system 500 is shown to include a user equipment (UE) 501 and a UE 502. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 and 502 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections (or channels) 503 and 504, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 505 may be used in vehicular applications and communications technologies, which are often referred to as V2X systems. V2X is a mode of communication where UEs (for example, UEs 501, 502) communicate with each other directly over the PC5/SL interface 505 and can take place when the UEs 501, 502 are served by RAN nodes 511, 512 or when one or more UEs are outside a coverage area of the RAN 510. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 501, 502, RAN nodes 511, 512, application servers 530, and pedestrian UEs 501, 502 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 501, 502 may be implemented/employed as Vehicle Embedded Communications Systems (VECS) or vUEs.

The UE 502 is shown to be configured to access an access point (AP) 506 (also referred to as also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 502, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 502 in RRC_CONNECTED being configured by a RAN node 511, 512 to utilize radio resources of LTE and WLAN. LWIP operation may involve the UE 502 using WLAN radio resources (e.g., connection 507) via Internet Protocol Security (IPsec) protocol tunneling to authenticate and encrypt packets (e.g., internet protocol (IP) packets) sent over the connection 507. IPsec tunneling may include encapsulating entirety of original IP packets and adding a new packet header thereby protecting the original header of the IP packets.

The RAN 510 can include one or more access nodes that enable the connections 503 and 504. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
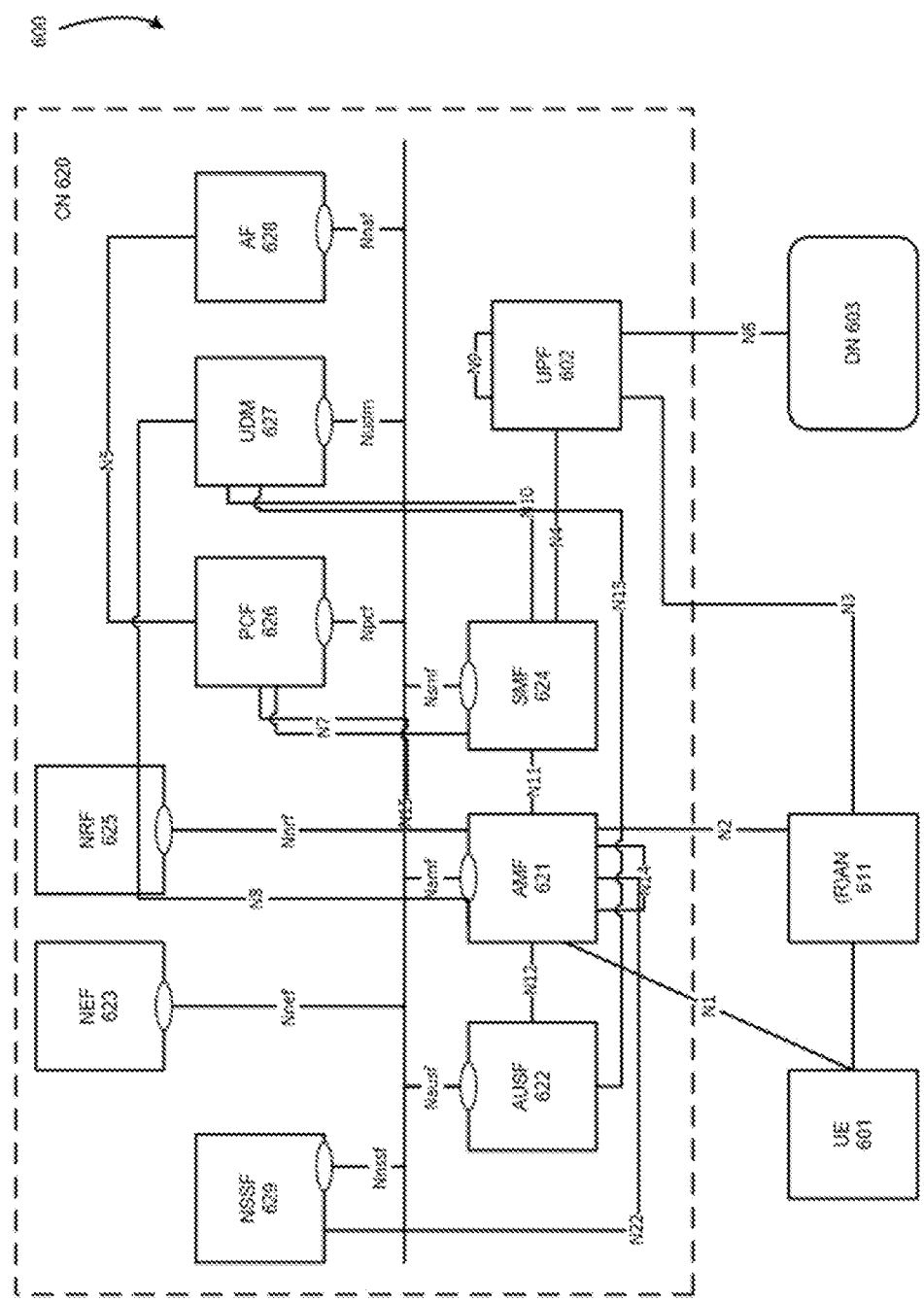
FIG. 6 illustrates an architecture of a system of a network in accordance with some embodiments.

FIG. 6 illustrates an architecture of a system 600 of a network in accordance with some embodiments. The system 600 is shown to include a UE 601, which may be the same or similar to UEs 501 and 502 discussed previously; a RAN node 611, which may be the same or similar to RAN nodes 511 and 512 discussed previously; a Data network (DN) 603, which may be, for example, operator services, Internet access or 3rd party services; and a 5G Core Network (5GC or CN) 620.

The CN 620 may include an Authentication Server Function (AUSF) 622; an Access and Mobility Management Function (AMF) 621; a Session Management Function (SMF) 624; a Network Exposure Function (NEF) 623; a Policy Control function (PCF) 626; a Network Function (NF) Repository Function (NRF) 625; a Unified Data Management (UDM) 627; an Application Function (AF) 628; a User Plane Function (UPF) 602; and a Network Slice Selection Function (NSSF) 629.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 602 may include an uplink classifier to support routing traffic flows to a data network. The DN 603 may represent various network operator services, Internet access, or third party services. NY 603 may include, or be similar to application server 930 discussed previously. The UPF 602 may interact with the SMF 624 via an N4 reference point between the SMF 624 and the UPF 602.

The AUSF 622 may store data for authentication of UE 601 and handle authentication related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 may be responsible for registration management (e.g., for registering UE 601, etc.), connection management, reachability management, mobility management, and lawful interception of AMF-related events, and access authentication and authorization. The AMF 621 may be a termination point for the an N11 reference point between the AMF 621 and the SMF 624. The AMF 621 may provide transport for Session Management (SM) messages between the UE 601 and the SMF 624, and act as a transparent proxy for routing SM messages. AMF 621 may also provide transport for short message service (SMS) messages between UE 601 and an SMS function (SMSF) (not shown by FIG. 6). AMF 621 may act as Security Anchor Function (SEA), which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a Security Context Management (SCM) function, which receives a key from the SEA that it uses to derive access-network specific keys. Furthermore, AMF 621 may be a termination point of RAN CP interface, which may include or be an N2 reference point between the (R)AN 611 and the AMF 621; and the AMF 621 may be a termination point of NAS (N1) signalling, and perform NAS ciphering and integrity protection.

AMF 621 may also support NAS signalling with a UE 601 over an N3 interworking-function (IWF) interface. The N3IWF may be used to provide access to untrusted entities. N3IWF may be a termination point for the N2 interface between the (R)AN 611 and the AMF 621 for the control plane, and may be a termination point for the N3 reference point between the (R)AN 611 and the UPF 602 for the user plane. As such, the AMF 621 may handle N2 signalling from the SMF 624 and the AMF 621 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 621 and an N17 reference point between the AMF 621 and a 5G-Equipment Identity Register (5G-EIR) (not shown by FIG. 6).

The SMF 624 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 624 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 624 may be included in the system 600, which may be between another SMF 624 in a visited network and the SMF 624 in the home network in roaming scenarios. Additionally, the SMF 624 may exhibit the Nsmf service-based interface.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using a standardized interfaces. The stored information can then be re-exposed by the NEF 623 to other NFs and AFs, and/or used for other purposes such as analytics. Additionally, the NEF 623 may exhibit an Nnef service-based interface.

The NRF 625 may support service discovery functions, receive NF Discovery Requests from NF instances, and provide the information of the discovered NF instances to the NF instances. NRF 625 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 625 may exhibit the Nnrf service-based interface.

The PCF 626 may provide policy rules to control plane function(s) to enforce them, and may also support unified policy framework to govern network behaviour. The PCF 626 may also implement a front end (FE) to access subscription information relevant for policy decisions in a UDR of the UDM 627. The PCF 626 may communicate with the AMF 621 via an N15 reference point between the PCF 626 and the AMF 621, which may include a PCF 626 in a visited network and the AMF 621 in case of roaming scenarios. The PCF 626 may communicate with the AF 628 via an N5 reference point between the PCF 626 and the AF 628; and with the SMF 624 via an N7 reference point between the PCF 626 and the SMF 624. The system 600 and/or CN 620 may also include an N24 reference point between the PCF 626 (in the home network) and a PCF 626 in a visited network. Additionally, the PCF 626 may exhibit an Npcf service-based interface.

The UDM 627 may handle subscription-related information to support the network entities' handling of communication sessions, and may store subscription data of UE 601. For example, subscription data may be communicated between the UDM 627 and the AMF 621 via an N8 reference point between the UDM 627 and the AMF 621 (not shown by FIG. 6). The UDM 627 may include two parts, an application FE and a User Data Repository (UDR) (the FE and UDR are not shown by FIG. 6). The UDR may store subscription data and policy data for the UDM 627 and the PCF 626, and/or structured data for exposure and application data (including Packet Flow Descriptions (PFDs) for application detection, application request information for multiple UEs 601) for the NEF 623. The Nudr service-based interface may be exhibited by the UDR 621 to allow the UDM 627, PCF 626, and NEF 623 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 624 via an N10 reference point between the UDM 627 and the SMF 624. UDM 627 may also support SMS management, wherein an SMS-FE implements the similar application logic as discussed previously. Additionally, the UDM 627 may exhibit the Nudm service-based interface.

The AF 628 may provide application influence on traffic routing, access to the Network Capability Exposure (NCE), and interact with the policy framework for policy control. The NCE may be a mechanism that allows the 5GC and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs. Additionally, the AF 628 may exhibit an Naf service-based interface.

The NSSF 629 may select a set of network slice instances serving the UE 601. The NSSF 629 may also determine allowed Network Slice Selection Assistance Information (NSSAI) and the mapping to the Subscribed Single-NSSAIs (S-NSSAIs), if needed. The NSSF 629 may also determine the AMF set to be used to serve the UE 601, or a list of candidate AMF(s) 621 based on a suitable configuration and possibly by querying the NRF 625. The selection of a set of network slice instances for the UE 601 may be triggered by the AMF 621 with which the UE 601 is registered by interacting with the NSSF 629, which may lead to a change of AMF 621. The NSSF 629 may interact with the AMF 621 via an N22 reference point between AMF 621 and NSSF 629; and may communicate with another NSSF 629 in a visited network via an N31 reference point (not shown by FIG. 6). Additionally, the NSSF 629 may exhibit an Nnssf service-based interface.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for notification procedure that the UE 601 is available for SMS transfer (e.g., set a UE not reachable flag, and notifying UDM 627 when UE 601 is available for SMS).

The CN 620 may also include other elements that are not shown by FIG. 6, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 6). Individual NFs may share a UDSF for storing their respective unstructured data or individual NFs may each have their own UDSF located at or near the individual NFs. Additionally, the UDSF may exhibit an Nudsf service-based interface (not shown by FIG. 6). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 6 for clarity. In one example, the CN 620 may include an Nx interface, which is an inter-CN interface between the MME (e.g., MME 521) and the AMF 621 in order to enable interworking between CN 620 and CN 520. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 600 may include multiple RAN nodes 611 wherein an Xn interface is defined between two or more RAN nodes 611 (e.g., gNBs and the like) that connecting to 5GC 620, between a RAN node 611 (e.g., gNB) connecting to 5GC 620 and an eNB (e.g., a RAN node 511 of FIG. 5), and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
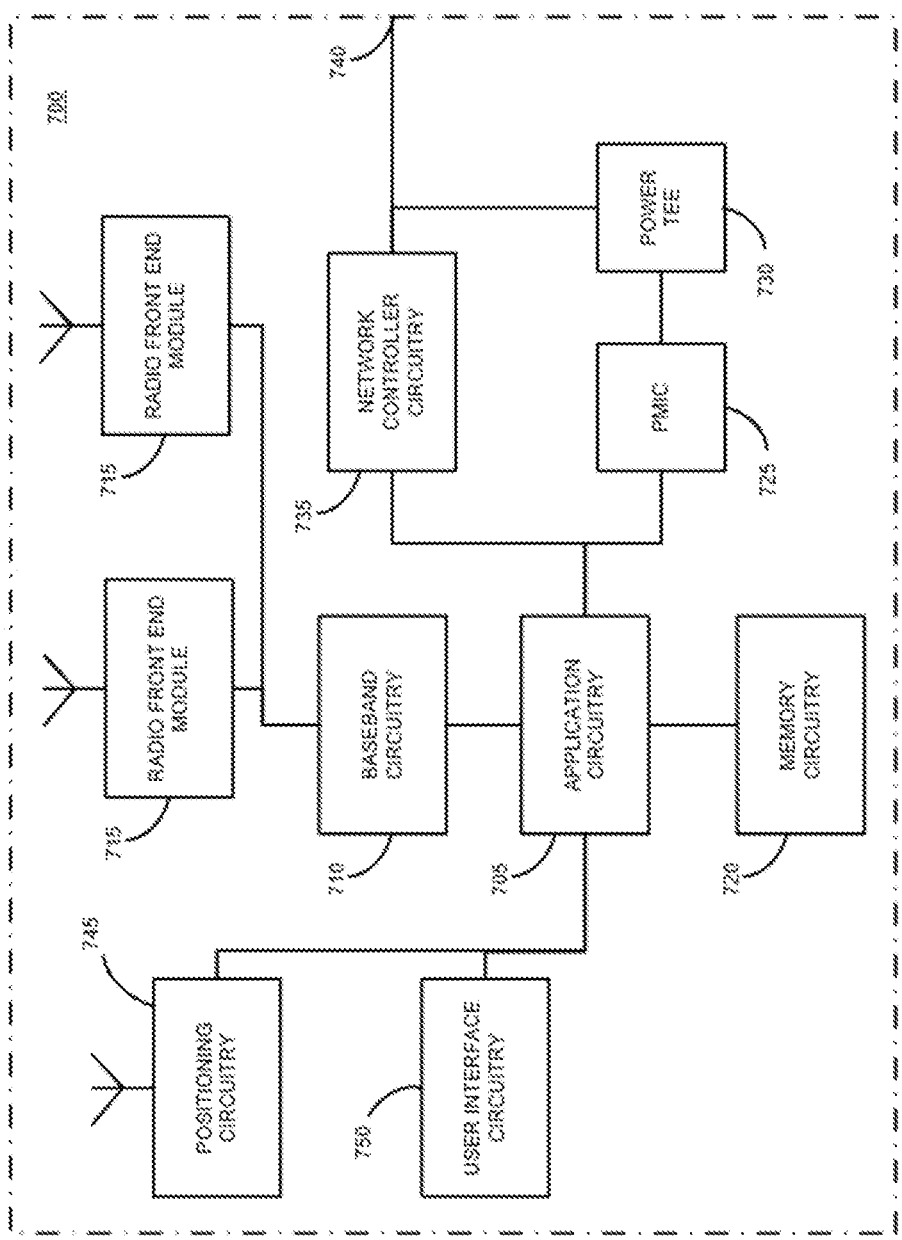
FIG. 7 illustrates an example of infrastructure equipment in accordance with various embodiments.

FIG. 7 illustrates an example of infrastructure equipment 700 in accordance with various embodiments. The infrastructure equipment 700 (or "system 700") may be implemented as a base station, radio head, RAN node, etc., such as the RAN nodes 511 and 512, and/or AP 506 shown and described previously. In other examples, the system 700 could be implemented in or by a UE, application server(s) 530, and/or any other element/device discussed herein. The system 700 may include one or more of application circuitry 705, baseband circuitry 710, one or more radio front end modules 715, memory 720, power management integrated circuitry (PMIC) 725, power tee circuitry 730, network controller 735, network interface connector 740, satellite positioning circuitry 745, and user interface 750. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 520 (or CN 620 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 705 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 705 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 700 may not utilize application circuitry 705, and instead may include a special-purpose processor/controller to process IP data received from an EPC or 5GC, for example.

Additionally or alternatively, application circuitry 705 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric including and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (for example, the radio front end modules 715).

User interface circuitry 750 may include one or more user interfaces designed to enable user interaction with the system 700 or peripheral component interfaces designed to enable peripheral component interaction with the system 700. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocol. In some implementations, the network controller circuitry 735 may include multiple controllers to provide connectivity to other networks using the same or different protocols.

The positioning circuitry 745, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 745 and/or positioning circuitry implemented by UEs 501, 502, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 745 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 745 may provide data to application circuitry 705 which may include one or more of position data or time data. Application circuitry 705 may use the time data to synchronize operations with other radio base stations (e.g., RAN nodes 511, 512, 611 or the like).

The components shown by FIG. 7 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 8:
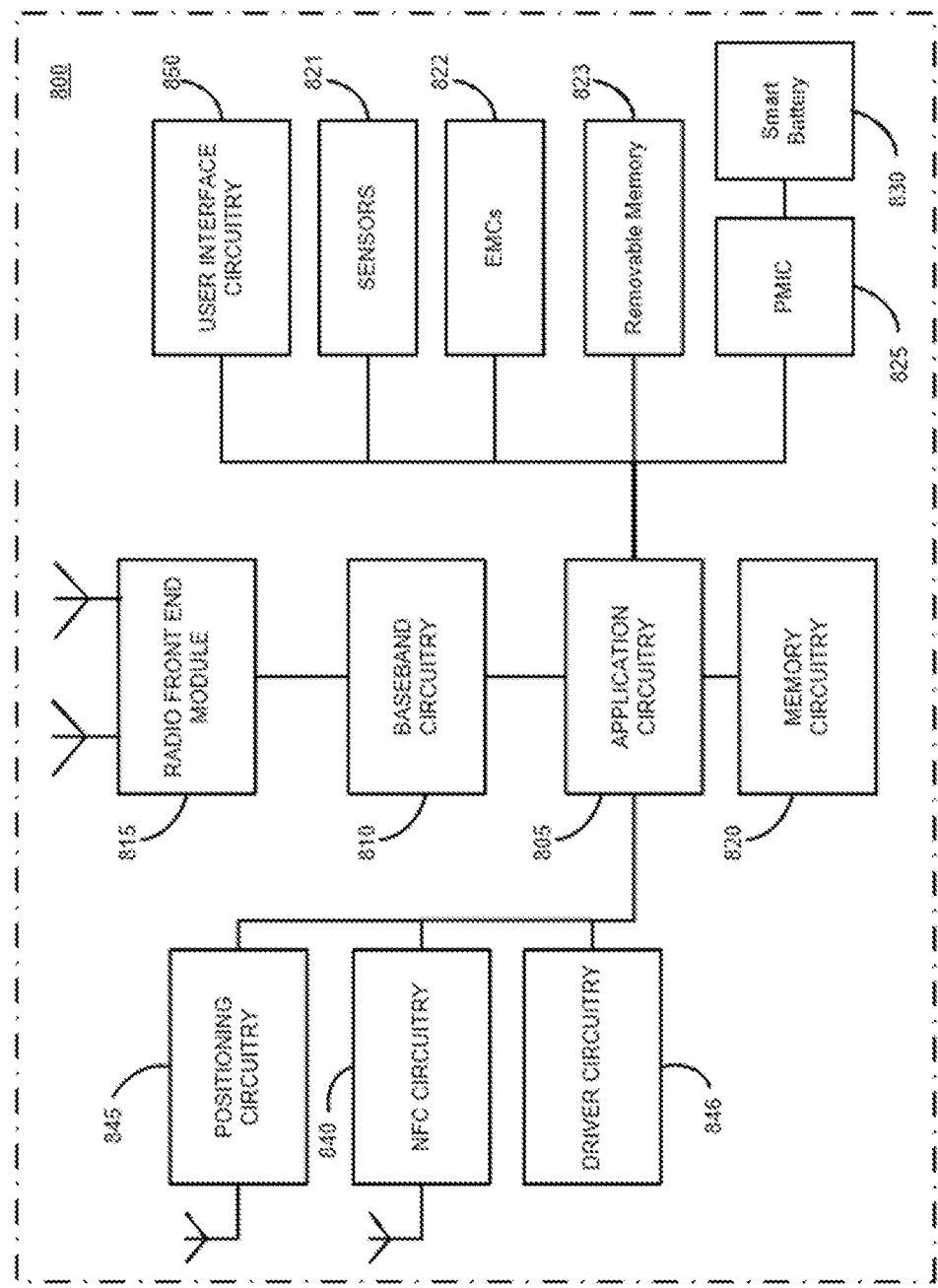
FIG. 8 illustrates an example of a platform in accordance with various embodiments.

FIG. 8 illustrates an example of a platform 800 (or "device 800") in accordance with various embodiments. In embodiments, the computer platform 800 may be suitable for use as UEs 501, 502, 601, application servers 530, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

The application circuitry 805 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 800. In some embodiments, processors of application circuitry 705/805 may process IP data packets received from an EPC or 5GC.

Application circuitry 805 be or include a microprocessor, a multi-core processor, a multithreaded processor, an ultra-low voltage processor, an embedded processor, or other known processing element. In one example, the application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 820 may be implemented, for example, as a solder-down substrate including one or more integrated circuits, a single packaged integrated circuit soldered to a main circuit board or a multi-chip module containing two or more integrated circuits. Although not shown, baseband circuitry 800 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 820 may include protocol processing circuitry with one or more instances of control circuitry (not shown) to provide control functions for the digital baseband circuitry and/or radio frequency circuitry (for example, the radio front end modules 1215).

The radio front end modules (RFEMs) 815 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 815. The RFEMs 815 may incorporate both millimeter wave antennas and sub-millimeter wave antennas.

The memory circuitry 820 may include any number and type of memory devices used to provide for a given amount of system memory. As examples, the memory circuitry 820 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to coupled portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, eternal HDDs, and the like.

The platform 800 may also include interface circuitry (not shown) that is used to connect eternal devices with the platform 800. The external devices connected to the platform 800 via the interface circuitry may include sensors 821, such as accelerometers, level sensors, flow sensors, temperature sensors, pressure sensors, barometric pressure sensors, and the like. The interface circuitry may be used to connect the platform 800 to electro-mechanical components (EMCs) 822, which may allow platform 800 to change its state, position, and/or orientation, or move or control a mechanism or system. The EMCs 822 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 may be configured to operate one or more EMCs 822 based on one or more captured events and/or instructions or control signals received from a service provider and/or various clients.

In some implementations, the interface circuitry may connect the platform 800 with positioning circuitry 845, which may be the same or similar as the positioning circuitry 845 discussed with regard to FIG. 7.

In some implementations, the interface circuitry may connect the platform 800 with near-field communication (NFC) circuitry 840, which may include an NFC controller coupled with an antenna element and a processing device. The NFC circuitry 840 may be configured to read electronic tags and/or connect with another NFC-enabled device.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensors 821 and control and allow access to sensors 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 820, the PMIC 825 may control power-source selection, voltage scaling, battery charging, or DC-to-DC conversion. The PMIC 825 may often be included when the platform 800 is capable of being powered by a battery 830, for example, when the device is included in a UE 501, 502, 601.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block 528 may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 800 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a Fle10ay system, or any number of other technologies. The bus may be a proprietary bus, for example, used in a SoC based system. Other bus systems may be included, such as an I2C interface, an SPI interface, point to point interfaces, and a power bus, among others.

Figure 13:
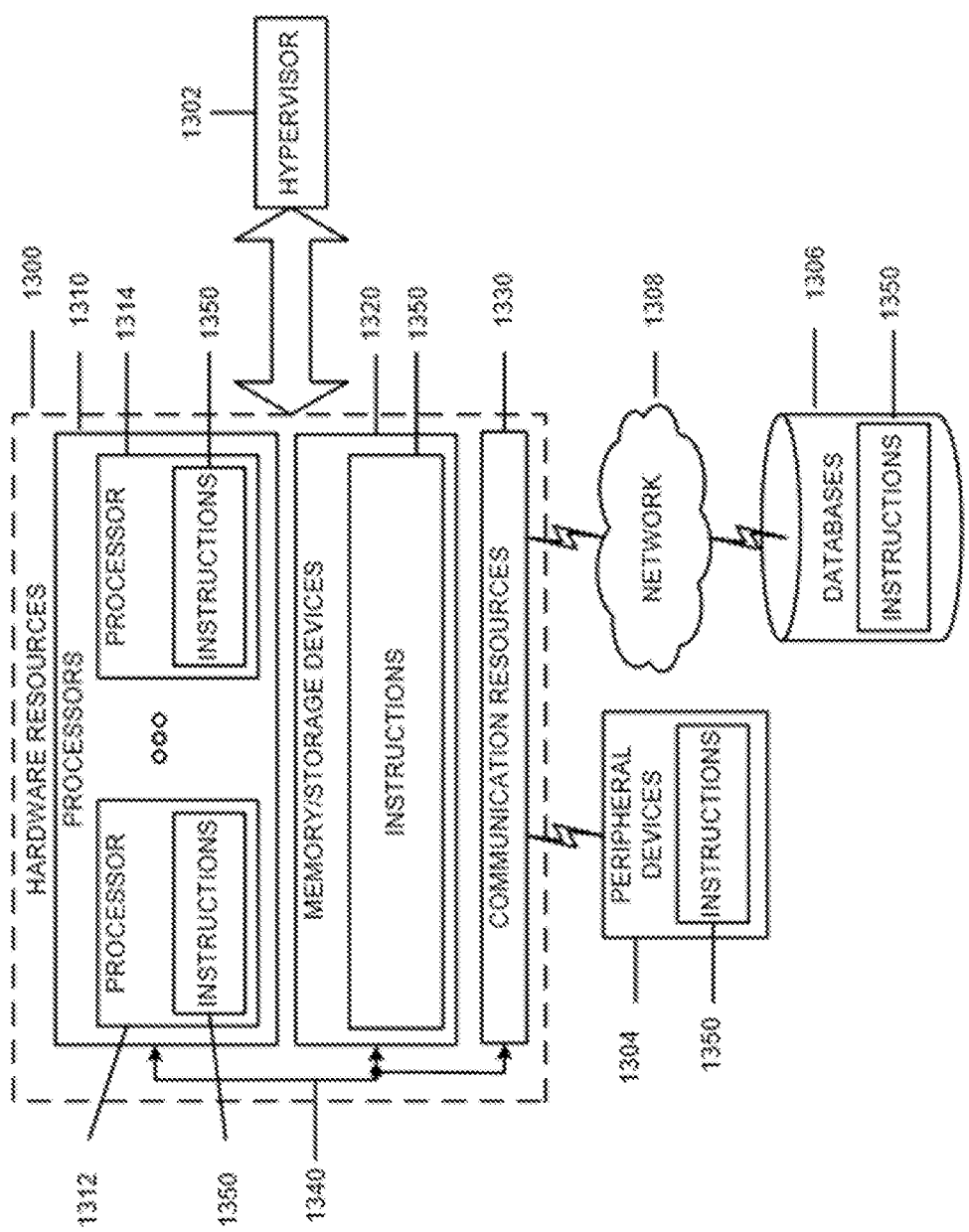
FIG. 13 is a block diagram illustrating components, according to some example embodiments, able to read instructions from a machine-readable or computer-readable medium (e.g., a non-transitory machine-readable storage medium) and perform any one or more of the methodologies discussed herein.

FIG. 13 illustrates example components of baseband circuitry 710/810 and radio front end modules (RFEM) 715/815 in accordance with some embodiments. As shown, the RFEM 715/815 may include Radio Frequency (RF) circuitry 1306, front-end module (FEM) circuitry 908, one or more antennas 920 coupled together at least as shown.

The baseband circuitry 710/810 may include circuitry such as, but not limited to, one or more single-core or multi-core processors. The baseband circuitry 710/810 may include one or more baseband processors or control logic to process baseband signals received from a receive signal path of the RF circuitry 906 and to generate baseband signals for a transmit signal path of the RF circuitry 906. Baseband processing circuity 710/80 may interface with the application circuitry 705/805 for generation and processing of the baseband signals and for controlling operations of the RF circuitry 906. For example, in some embodiments, the baseband circuitry 710/80 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 710/810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 710/810 may include Fast-Fourier Transform (FFT), precoding, or constellation mapping/demapping functionality. In some embodiments, encoding/decoding circuitry of the baseband circuitry 710/810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 710/810 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 710/810 and the application circuitry 705/805 may be implemented together such as, for example, on a system on a chip (SOC).

In some embodiments, the baseband circuitry 710/810 may provide for communication compatible with one or more radio technologies. For example, in some embodiments, the baseband circuitry 710/810 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 710/810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 808 and provide baseband signals to the baseband circuitry 710/810. RF circuitry 906 may also include a transmit signal path which may include circuitry to up-convert baseband signals provided by the baseband circuitry 710/810 and provide RF output signals to the FEM circuitry 808 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 808 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 710/810 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 710/810 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 710/810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 710/810 or the applications processor 705/805 depending on the desired output frequency. In some embodiments, a divider control input (e.g., N) may be determined from a look-up table based on a channel indicated by the applications processor 705/805.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 920, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 920. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 920).

Processors of the application circuitry 705/805 and processors of the baseband circuitry 710/810 may be used to execute elements of one or more instances of a protocol stack. For example, processors of the baseband circuitry 710/810, alone or in combination, may be used execute Layer 3, Layer 2, or Layer 1 functionality, while processors of the baseband circuitry 710/810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
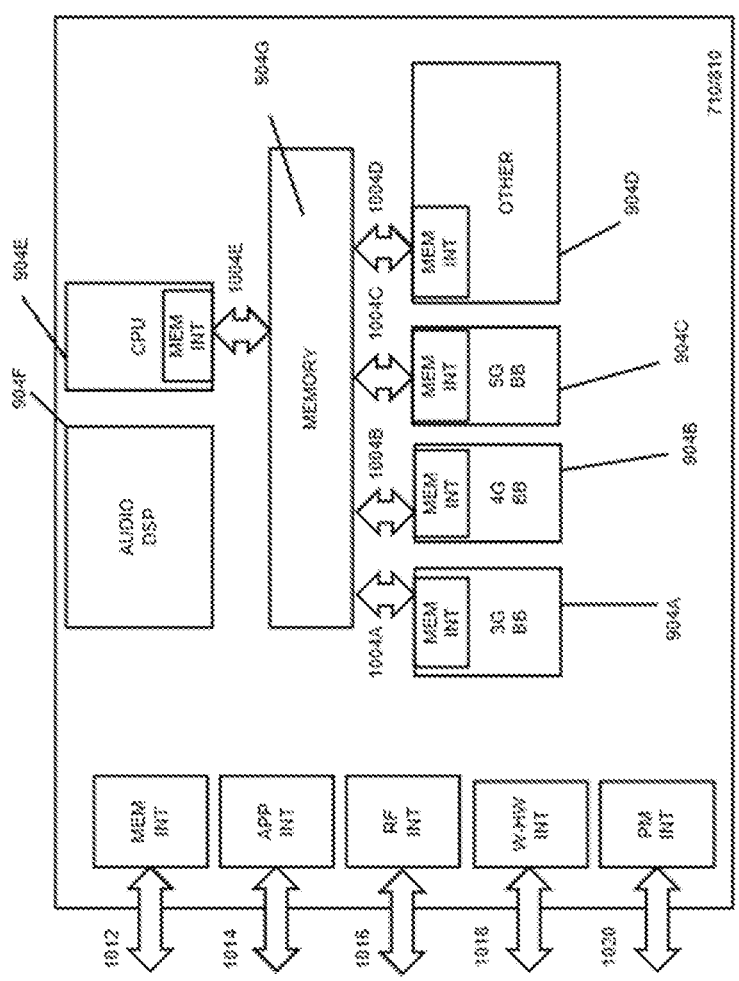
FIG. 10 illustrates example interfaces of baseband circuitry in accordance with some embodiments.

FIG. 10 illustrates example interfaces of baseband circuitry in accordance with some embodiments. As discussed above, the baseband circuitry 710/810 of FIGS. 7-8 may comprise processors 804A-804E and a memory 904G utilized by said processors. Each of the processors 904A-904E may include a memory interface, 1004A-1004E, respectively, to send/receive data to/from the memory 904G.

Figure 9:
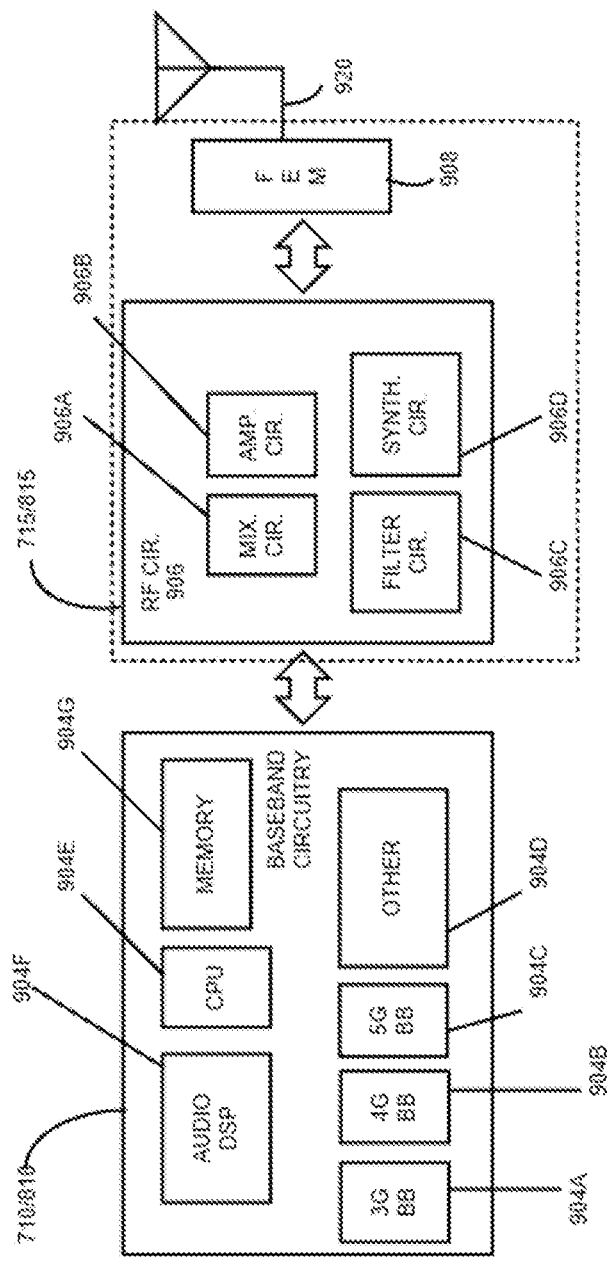
FIG. 9 illustrates example components of baseband circuitry and radio front end modules in accordance with various embodiments.

The baseband circuitry 710/810 may further include one or more interfaces to communicatively couple to other circuitries/devices, such as a memory interface 1012 (e.g., an interface to send/receive data to/from memory external to the baseband circuitry 710/1210), an application circuitry interface 1014 (e.g., an interface to send/receive data to/from the application circuitry 705/805 of FIGS. 7-8), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMIC 825.

Figure 11:
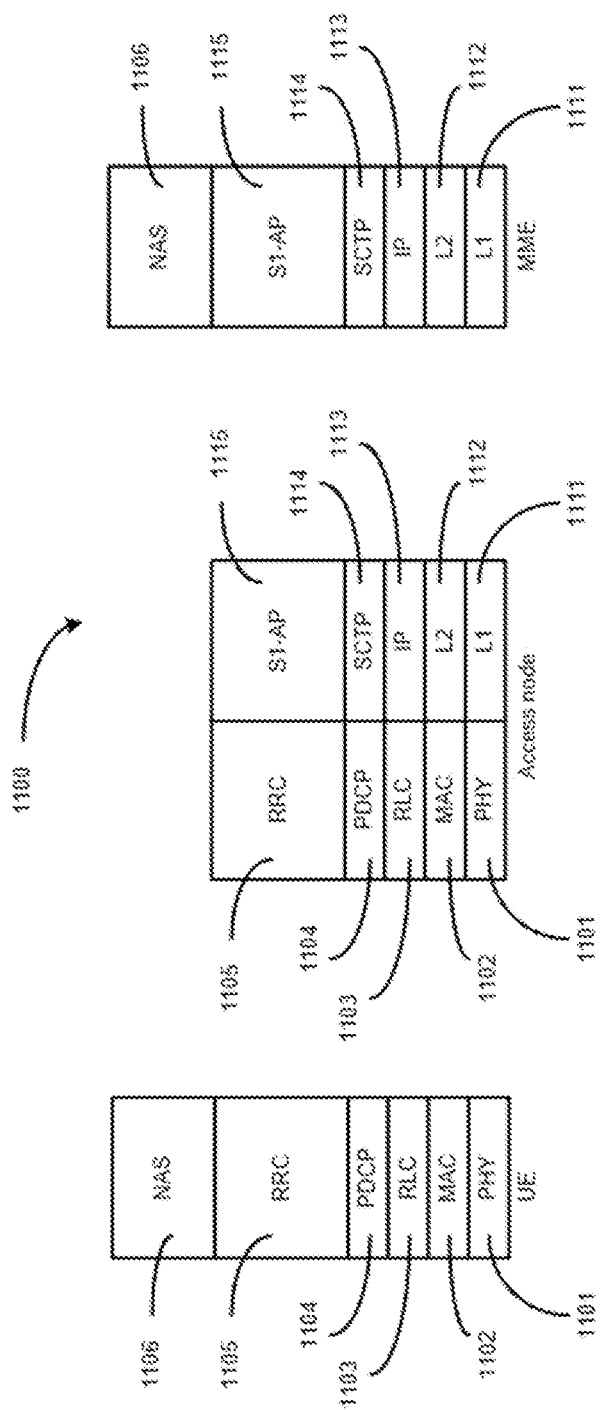
FIG. 11 is an illustration of a control plane protocol stack in accordance with some embodiments.

FIG. 11 is an illustration of a control plane protocol stack in accordance with some embodiments. In this embodiment, a control plane 1100 is shown as a communications protocol stack between the UE 501 (or alternatively, the UE 502), the RAN node 511 (or alternatively, the RAN node 512), and the MME 521.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1103 may operate in a plurality of modes of operation, including: Transparent Mode™, Unacknowledged Mode (UM), and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 1101, the MAC layer 1102, the RLC layer 1103, the PDCP layer 1104, and the RRC layer 1105.

The non-access stratum (NAS) protocols 1106 form the highest stratum of the control plane between the UE 501 and the MME 521. The NAS protocols 1106 support the mobility of the UE 501 and the session management procedures to establish and maintain IP connectivity between the UE 501 and the P-GW 523.

The S1 Application Protocol (S1-AP) layer 1115 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1114 may ensure reliable delivery of signaling messages between the RAN node 511 and the MME 521 based, in part, on the IP protocol, supported by the IP layer 1113. The L2 layer 1112 and the L1 layer 1111 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 1111, the L2 layer 1112, the IP layer 1113, the SCTP layer 1114, and the S1-AP layer 1115.

Figure 12:
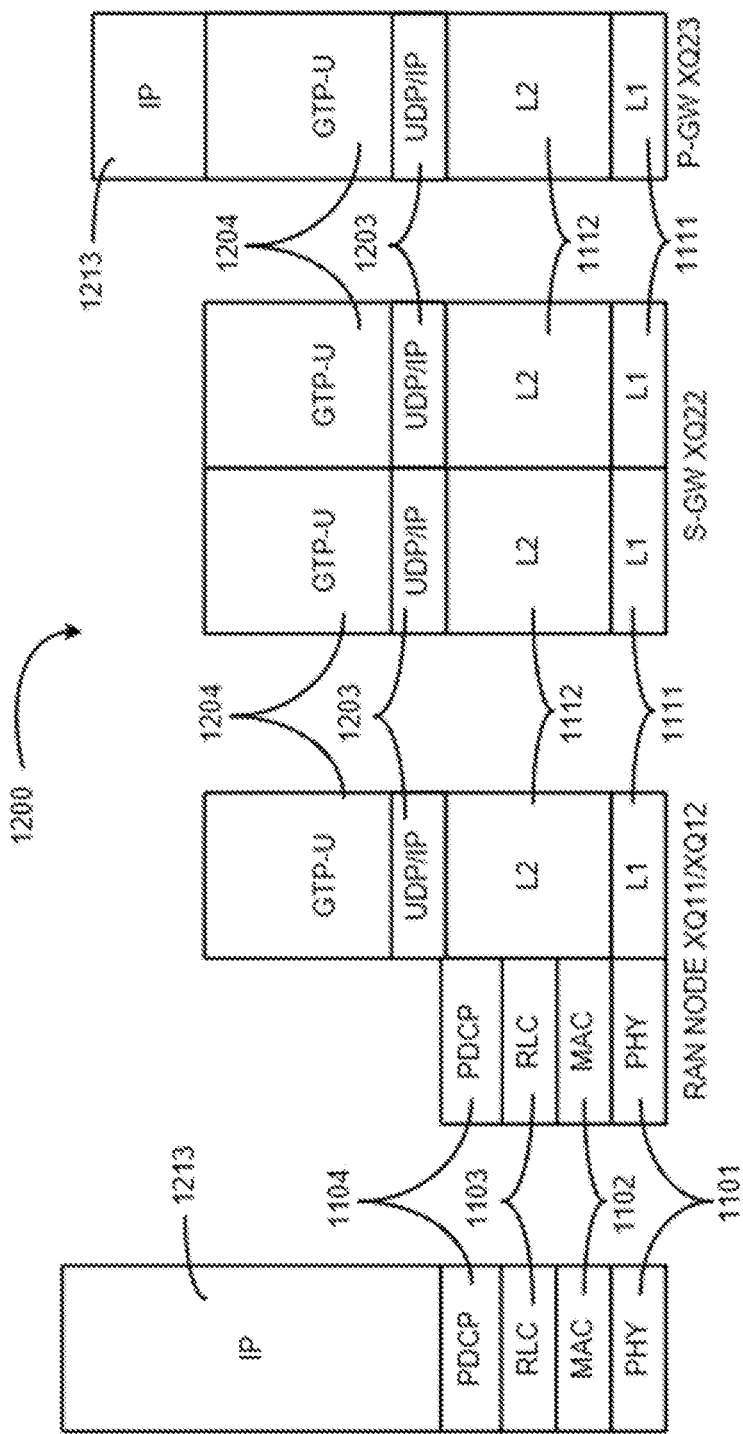
FIG. 12 is an illustration of a user plane protocol stack in accordance with some embodiments.

FIG. 12 is an illustration of a user plane protocol stack in accordance with some embodiments. In this embodiment, a user plane 1200 is shown as a communications protocol stack between the UE 501 (or alternatively, the UE 502), the RAN node 511 (or alternatively, the RAN node 512), the S-GW 522, and the P-GW 523. The user plane 1200 may utilize at least some of the same protocol layers as the control plane 1500. For example, the UE 501 and the RAN node 511 may utilize a Uu interface (e.g., an LTE-Uu interface) to exchange user plane data via a protocol stack comprising the PHY layer 1501, the MAC layer 1502, the RLC layer 1503, the PDCP layer 1504.

The General Packet Radio Service (GPRS) Tunneling Protocol for the user plane (GTP-U) layer 1204 may be used for carrying user data within the GPRS core network and between the radio access network and the core network. The user data transported can be packets in any of IPv4, IPv6, or PPP formats, for example. The UDP and IP security (UDP/IP) layer 1203 may provide checksums for data integrity, port numbers for addressing different functions at the source and destination, and encryption and authentication on the selected data flows. The RAN node 511 and the S-GW 522 may utilize an S1-U interface to exchange user plane data via a protocol stack comprising the L1 layer 1511, the L2 layer 1512, the UDP/IP layer 1203, and the GTP-U layer 1204. The S-GW 522 and the P-GW 523 may utilize an S5/S8a interface to exchange user plane data via a protocol stack comprising the L1 layer 1511, the L2 layer 1512, the UDP/IP layer 1203, and the GTP-U layer 1204. As discussed above with respect to FIG. 15, NAS protocols support the mobility of the UE 501 and the session management procedures to establish and maintain IP connectivity between the UE 501 and the P-GW 523.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1302 may be executed to provide an execution environment for one or more network slices/subslices to utilize the hardware resources 1300. A "virtualized resource" may refer to compute, storage, and/or network resources provided by virtualization infrastructure to an application, device, system, etc.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

The memory/storage devices 1320 may include main memory, disk storage, or any suitable combination thereof. The memory/storage devices 1320 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

In some embodiments, the electronic device(s), network(s), system(s), chip(s) or component(s), or portions or implementations thereof, of FIGS. 5-13, or some other figure herein may be configured to perform one or more processes, techniques, or methods as described herein, or portions thereof. For example, the device of FIGS. 7, 8, and 13, and particularly, the baseband circuitry of FIGS. 9 and 10, may be configured to implement one or more of the processes described herein (for example, the operation flows/algorithmic structures of FIGS. 3-4.

In some embodiments, the electronic device(s), network(s), system(s), chip(s) or component(s), or portions or implementations thereof, of FIGS. 5-13, or some other figure herein, may be configured to perform one or more processes, techniques, or methods as described herein, or portions thereof. Some processes are depicted in FIG. 3 and FIG. 4.

EXAMPLES

Example 1 may include method for new radio (NR) communications, comprising a method of configuring an UE with monitoring of new compact or size-matched DCI formats (referred to as DCI formats 0_2 and 1_2 for DL and UL scheduling respectively) or monitoring of optimized DCI formats 0_0/0_1 and 1_0/1_1, as part of the search space set configuration via UE-specific higher layer signaling.

Example 2 may include the method of example 1 and/or some other examples herein, wherein the new compact DCI format has DCI payload size lower than the DCI formats 0_0/1_0 for a given UL and/or DL BWP sizes. New size-matched DCI format has DCI payload size that is matched to DCI format 0_1 for UL scheduling and matched to DCI format 1_1 for DL scheduling, where these two new DL and UL DCI formats may not be size-matched between DL and UL formats.

Example 3 may include the method of example 1 and/or some other examples herein, wherein the new DCI formats 0_2/1_2 are only introduced to enable new features and their corresponding signaling. If no new DCI field is added, the existing fallback/non-fallback formats are used and their corresponding fields may be further optimized and re-interpreted.

Example 4 may include the method of example 1 and/or some other examples herein, wherein the new fields may be added to DCI format 0_1 or 1_1 or both, the presence of which fields and their bit-widths may depend on higher layer configuration of related features.

Example 5 may include the method of example 1 and/or some other examples herein, wherein the new DCI format is defined as an optional UE capability.

Example 6 may include the method of example 1 and/or some other examples herein, wherein for a UE supporting monitoring of the new compact or size-matched DCI formats, a UE may be configured using UE-specific higher layer signaling with possible monitoring of DCI formats 0_2 and 1_2 first, before it may be configured to monitor for these new compact or size-matched DCI formats as part of search space set configuration.

Example 7 may include the method of example 1 and/or some other examples herein, wherein for a UE supporting monitoring of the new compact or size-matched DCI formats, the UE may be directly configured to monitor for the new compact or size-matched DCI format as part of the search space set configuration via UE-specific higher layer signaling, without a need to be first configured with separate UE-specific signaling.

Example 8 may include the method of example 1 and/or some other examples herein, wherein the compact or size-matched DCI formats may only be configured for monitoring in a PDCCH UE-specific search space (USS).

Example 9 may include the method of example 1 and/or some other examples herein, wherein the compact or size-matched DCI formats may be configured for monitoring in a PDCCH UE-specific search space or in a common search space (CSS).

Example 10 may include the method of example 1 and/or some other examples herein, wherein the UE may be configured with monitoring of either of DCI format 0_2 or format 1_2 for UL or DL scheduling respectively in a configured search space set, and for scheduling of the other link direction (for example, DL or UL respectively), the corresponding "fallback DCI format", for example, DCI format 1_0 and 0_0 for DL and UL scheduling respectively, is assumed, and these two DCI formats are size-matched in a configured search space set.

Example 11 may include the method of example 1 and/or some other examples herein, wherein the compact or size-matched DCI formats 0_2/1_2 are transmitted with CRC scrambled with either C-RNTI or CS-RNTI or a higher layer-configured RNTI.

Example 12 may include the method of examples 8 or 9 and/or some other examples herein, wherein, if the compact or size-matched DCI format is configured for monitoring in a PDCCH USS, the higher layer field USS-DCI-format is extended to 2-bit field to indicate choice between DCI formats: (i) 0_0/1_0; (ii) 0_1 & 1_1; and (iii) 0_2/1_2, with the fourth code-point being reserved.

Example 13 may include the method of examples 8 or 9 and/or some other examples herein, wherein, if the compact or size-matched DCI format is configured for monitoring in a PDCCH USS, the higher layer field USS-DCI-format is extended to 2-bit field to indicate choice between DCI formats: (i) 0_0/1_0; (ii) 0_1/1_1; (iii) 0_2/1_2; and (iv) 0_2/1_2 and 0_1/1_1.

Example 14 may include the method of example 9 and/or some other examples herein, wherein, if the compact or size-matched DCI format is configured for monitoring in a PDCCH CSS, a new higher layer parameter may be used as part of the search space set configuration, that may be conveyed via UE-specific RRC signaling, to indicate whether to monitor for DCI formats 0_0/1_0 or DCI formats 0_2/1_2 with CRC scrambled with C-RNTI or CS-RNTI or other configurable RNTI.

Example 15 may include the method of example 1 and/or some other examples herein, wherein the DCI size budget is extended for UEs supporting DCI formats 0_2/1_2 to maximum of four DCI format sizes for PDCCH with CRC scrambled with C-RNTI or CS-RNTI and one additional DCI format size for other format/RNTI combination.

Example 16 may include the method of examples 2 or 3 and/or some other examples herein, wherein, if the UE is configured to monitor for DCI formats 0_1/1_1 and 0_2/1_2 in a search space set, the DCI format to be monitored with CRC scrambled with CS-RNTI is additionally indicated between the formats 0_1/1_1 and 0_2/1_2 via a separate higher layer parameter.

Example 17 may include the method of examples 8 or 9 and/or some other examples herein, wherein, if the UE is configured to monitor for DCI formats 0_1/1_1 and 0_2/1_2 in a search space set, the DCI format to be monitored with CRC scrambled with CS-RNTI is the DCI format 0_2/1_2 by default.

Example 18 may include the method of examples 8 or 9 and/or some other examples herein, wherein when the new format is introduced, the UE can be configured as part of the search space set configuration in PDCCH-Configuration, to monitor in the UE-SS between non-fallback DCI formats, and new DCI formats.

Example 19 may include the method of examples 8 or 9 and/or some other examples herein, wherein the new DCI format introduced, is size-matched to the existing non-fallback format to avoid introducing a new DCI size, if both versions of non-fallback formats (for example, DCI formats 0_1/1_1 and 0_2/1_2) are configured to be monitored in a PDCCH search space set.

Example 20 may include the method of example 19 and/or some other examples herein, wherein if the UE is expected to monitor for both non-fallback DCI formats, and new DCI format, identification between these two formats is defined by introducing new RNTIs for URLLC or a new header bit field or extending the existing header bit-field that would apply to both sets of DCI formats 0_1/1_1 and 0_2/1_2.

Example 21 may include the method of example 19 and/or some other examples herein, wherein indication of the DCI format between non-fallback and new DCI formats to the UE is done by means of BWP indication field, configuring two BWPs (potentially of same characteristics) each associated with one of size-matched DCI formats. The UE monitors only one of the formats in each BWP. The RRC configuration then refers to the configured active BWP, meaning that each of the higher layer configurations are specific to BWP. Once the UE is pointed to a particular BWP, the corresponding RRC configuration reveals the set of enabled features/capabilities for that BWP, and the rest of DCI fields are interpreted accordingly.

Example 22 may include the method of example 1 and/or some other examples herein, wherein the minimum requirements on BD efforts per slot and the number of CCEs for channel estimation during a slot duration are the same, irrespective of support and configuration of monitoring of compact or size-matched DCI format.

Example 23 may include the method of example 1 and/or some other examples herein, wherein, for RIV-based (Type 1 RA) resource allocation using K-PRB granularity, the value of K is set separately for DL and UL as a new higher layer parameter via UE-specific RRC signaling on a per-BWP (BandWidth Part) basis.

Example 24 may include the method of example 1 and/or some other examples herein, wherein, for RIV-based (Type 1 RA) resource allocation using K-PRB granularity, the value of K is same as the Resource Block Group (RBG) size corresponding to RBG Configuration #2 as specified for a given BWP size.

Example 25 may include the method of example 1 and/or some other examples herein, wherein, for RIV-based (Type 1 RA) resource allocation using K-PRB granularity, the value of K is configured to use corresponding RBG sizes for the BWP from either RBG configuration #1 or #2.

Example 26 may include the method of example 1 and/or some other examples herein, wherein, for RIV-based (Type 1 RA) resource allocation using K-PRB granularity, the indexing of the K-PRB contiguous frequency resources within a BWP is such that the lowest PRB index of the BWP marks the first K-PRB set, with the last PRB-set possibly having fewer than K PRBs.

Example 27 may include the method of example 1 and/or some other examples herein, wherein, for RIV-based (Type 1 RA) resource allocation using K-PRB granularity, the indexing of the K-PRB contiguous frequency resources within a BWP can be similar to the approach used for indexing of RBGs within a BWP.

Example 28 may include the method of example 1 and/or some other examples herein, wherein, for time-domain resource allocation, only PDSCH and PUSCH mapping type B may be used for time-domain scheduling when using DCI formats 1_2 and 0_2 respectively.

Example 29 may include the method of example 1 and/or some other examples herein, wherein, for time-domain resource allocation, only mapping type B may be used for PUSCH scheduling using DCI format 0_2, but both mapping types A and B are supported for PDSCH when scheduled using DCI format 1_2.

Example 30 may include the method of example 1 and/or some other examples herein, wherein, for time-domain resource allocation, the slot offset value between PDCCH and scheduled PDSCH, K0, may be indicated from a set of values that is restricted to a lower maximum value than when scheduling using DCI formats 1_0 or 1_1.

Example 31 may include the method of example 1 and/or some other examples herein, wherein, for time-domain resource allocation, the slot offset value between PDCCH and scheduled PUSCH, K2, may be indicated from a set of values that is restricted to a lower maximum value than when scheduling using DCI formats 0_0 or 0_1.

Example 32 may include the method of examples 1, 20, or 21 and/or some other examples herein, wherein, for time-domain resource allocation, the set of possible K0 or K2 values are defined as a function of the subcarrier spacing (SCS).

Example 33 may include the method of example 1 and/or some other examples herein, wherein, for time-domain resource allocation, based on UE-specific configuration of dynamically indicated numbers of repetitions of the PDSCH/PUSCH, a field in the scheduling DCI is used to dynamically indicate the number of repetitions.

Example 34 may include the method of example 1 and/or some other examples herein, wherein, for time-domain resource allocation of PDSCH, instead of explicit indication of the number of repetitions used for the scheduled PDSCH, the information is indicated at least in part based on the maximum Aggregation Level (AL) or maximum Repetition Level (RL) defined for the search space set where the scheduling PDCCH is detected, or, alternatively, based on the AL or RL used for PDCCH candidate used to transmit the scheduling DCI.

Example 35 may include the method of example 1 and/or some other examples herein, wherein, for Modulation and Coding Scheme (MCS) indication, the MCS field for scheduling PDSCH or PUSCH in a compact or size-matched DCI format 1_2 or 0_2 respectively and/or in non-fallback DCI formats 1_1 and 0_1 respectively can be reduced from 5 bit to 4 or 3 bit.

Example 36 may include the method of example 35 and/or some other examples herein, wherein, the mapping of 32 entries to 16 or 8 entries respectively for 4 or 3 bit tables are either predefined or be semi-statically configurable via UE-specific (re)configuration RRC message.

Example 37 may include the method of example 35 and/or some other examples herein, wherein, the mapping of 5 bit tables to smaller tables is realized using combinatorial index approach similar to the one used for EPDCCH PRB-pair resource set configuration.

Example 38 may include the method of example 1 and/or some other examples herein, wherein addition of certain bit-fields are considered to new DCI formats 0_2/1_2 or DCI formats 0_1/1_1 when configured, to enable different URLLC-related functionalities.

Example 39 may include the method of example 1 and/or some other examples herein, wherein DL Pre-emption Indication (PI) is included in DCI formats 1_1 or DCI format 1_2, to indicate whether the current PDSCH assignment may be pre-empted or not.

Example 40 may include a method for new radio (NR) communications, the method comprising: configuring or causing to configure a UE with monitoring of PDCCH with monitoring periodicity less than slot duration (PDCCH monitoring case 2), wherein the minimum requirement on the number of BDs and CCEs per slot is increased compared to Case 1-1 values for the corresponding subcarrier spacing values, with the constraint that the UE is not expected to monitor PDCCH with number of BDs and/or number of CCEs over any span of 'p' consecutive OFDM symbols that is/are larger than the corresponding values defined for PDCCH monitoring case 1-1 for the respective SCS values.

Example 41 may include the method of example 40 and/or some other examples herein, wherein the value of p is 3.

Example 42 may include the method of example 40 and/or some other examples herein, wherein the minimum requirements on BDs and CCEs is defined on a per-half-slot basis.

Example 43 may include one or more non-transitory, computer-readable media having instructions that, when executed, cause a user equipment (UE) in a new radio (NR) system to: transmit, to a base station, an indication of a capability of the UE to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format is different from DCI formats 1_0 or 1_1, and the second DCI format is different from DCI formats 0_0 or 0_1; determine search spaces for monitoring physical downlink control channel (PDCCH) candidates to obtain DCI formats indicated by the base station; monitor the search spaces for the PDCCH candidates; and detect the indicated DCI formats, wherein the indicated DCI formats are selected from the first DCI format, the second DCI format, the DCI format 1_0, the DCI format 1_1, the DCI format 0_0, or the DCI format 0_1.

Example 44 may include the one or more non-transitory, computer-readable media of example 43 and/or some other examples herein, wherein the indicated DCI formats by the base station are selected from the DCI format 10, the DCI format 1_1, the DCI format 0_0, or the DCI format 0_1, and wherein the instructions, when executed, further cause the UE to interpret fields of the indicated DCI formats differently from the fields of the DCI format 1_0, the DCI format 1_1, the DCI format 0_0, or the DCI format 0_1 as specified in Rel-15 NR specifications based on configuration conveyed by a protocol layer.

Example 45 may include the one or more non-transitory, computer-readable media of example 43 and/or some other examples herein, wherein the indicated DCI formats includes the first DCI format and the second DCI format, and wherein the first DCI format and the second DCI format have smaller sizes than the DCI formats 0_0 and 1_0 for corresponding UL BWP and DL BWP, and wherein the first DCI format and the second DCI format have a same size.

Example 46 may include the one or more non-transitory, computer-readable media of example 43 and/or some other examples herein, wherein the first DCI format has a same size of the DCI format 0_1, and the second DCI format has a same size of the DCI format 1_1.

Example 47 may include the one or more non-transitory, computer-readable media of example 43 and/or some other examples herein, wherein the first DCI format or the second DCI format has a field not presented in the DCI format 1_0, the DCI format 1_1, the DCI format 0_0, or the DCI format 0_1.

Example 48 may include the one or more non-transitory, computer-readable media of example 43 and/or some other examples herein, wherein the first DCI format or the second DCI format has a field that is present in the DCI format 1_0, the DCI format 1_1, the DCI format 0_0, or the DCI format 0_1, and wherein the field in the first DCI format or the second DCI format is of a smaller size than the field presented in the DCI format 1_0, the DCI format 1_1, the DCI format 0_0, or the DCI format 0_1.

Example 49 may include the one or more non-transitory, computer-readable media of example 43 and/or some other examples herein, wherein the first DCI format or the second DCI format is conveyed to the UE by a PDCCH candidate that includes an associated cyclic redundancy code (CRC) scrambled with Cell Radio Network Temporary Identifier (C-RNTI), Configured Scheduling (CS)-RNTI, or other configurable RNTI.

Example 50 may include the one or more non-transitory, computer-readable media of example 43 and/or some other examples herein, wherein the search spaces for monitoring PDCCH candidates includes a UE-specific search space (USS) or a common search space (CSS).

Example 51 may include the one or more non-transitory, computer-readable media of example 50 and/or some other examples herein, wherein the search spaces for monitoring PDCCH candidates are USS, which are conveyed to the UE by a higher layer 2-bit field USS-DCI-format to indicate choice between DCI formats: 0_0, 1_0, 0_1, 1_1, the first DCI format, or the second DCI format to be monitored.

Example 52 may include the one or more non-transitory, computer-readable media of example 43 and/or some other examples herein, wherein the first DCI format or the second DCI format has a field to indicate a frequency domain resource assignment or a time domain resource assignment.

Example 53 may include the one or more non-transitory, computer-readable media of example 52 and/or some other examples herein, wherein the frequency domain resource assignment is a Type 1 resource assignment using a granularity of K>1 contiguous-in-frequency physical resource blocks (PRBs).

Example 54 may include the one or more non-transitory, computer-readable media of example 53 and/or some other examples herein, wherein the value of K is given by a resource block group (RBG) size for the corresponding DL or UL BWP respectively according to one of: RBG configuration 1 or RBG configuration 2.

Example 55 may include the one or more non-transitory, computer-readable media of example 52 and/or some other examples herein, wherein the time domain resource assignment only uses PDSCH and PUSCH mapping type B for time-domain scheduling when using the first DCI format, the second DCI format respectively.

Example 56 may include the one or more non-transitory, computer-readable media of example 43 and/or some other examples herein, wherein the first DCI format or the second DCI format includes a Modulation and coding scheme (MCS) filed of length 3 or 4 bits for scheduling PDSCH or PUSCH.

Example 57 may include an apparatus for wireless communication, comprising: processing circuitry to: transmit, to a base station in a new radio (NR) system, an indication of a capability of a user equipment (UE) to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format is different from DCI formats 1_0 or 1_1, and the second DCI format is different from DCI formats 0_0 or 0_1; determine search spaces for monitoring physical downlink control channel (PDCCH) candidates to obtain DCI formats indicated by the base station; monitor the search spaces for the PDCCH candidates; and detect the indicated DCI formats, wherein the indicated DCI formats are selected from the first DCI format, the second DCI format, the DCI format 1_0, the DCI format 1_1, the DCI format 0_0, or the DCI format 0_1; and memory circuitry coupled to the processing circuitry, the memory circuitry to store the indicated DCI formats.

Example 58 may include the apparatus of example 57 and/or some other examples herein, wherein the indicated DCI formats by the base station are selected from the DCI format 1_0, the DCI format 1_1, the DCI format 0_0, or the DCI format 0_1, and wherein the processing circuitry is to interpret fields of the indicated DCI formats differently from the fields of the DCI format 1_0, the DCI format 1_1, the DCI format 0_0, or the DCI format 0_1 as specified in Rel-15 NR specifications based on configuration conveyed by a protocol layer.

Example 59 may include the apparatus of example 57 and/or some other examples herein, wherein the indicated DCI formats includes the first DCI format and the second DCI format, and wherein the first DCI format and the second DCI format have smaller sizes than the DCI formats 0_0 and 1_0 for corresponding UL BWP and DL BWP, and wherein the first DCI format and the second DCI format have a same size.

Example 60 may include the apparatus of example 57 and/or some other examples herein, wherein the first DCI format has a same size of the DCI format 0_1, and the second DCI format has a same size of the DCI format 1_1.

Example 61 may include the apparatus of example 57 and/or some other examples herein, wherein the first DCI format or the second DCI format has a field not presented in the DCI format 1_0, the DCI format 1_1, the DCI format 0_0, or the DCI format 0_1.

Example 62 may include the apparatus of example 57 and/or some other examples herein, wherein the search spaces for monitoring PDCCH candidates includes a UE-specific search space (USS) or a common search space (CSS).

Example 63 may include the apparatus of example 62 and/or some other examples herein, wherein the search spaces for monitoring PDCCH candidates are USS, which are conveyed to the UE by a higher layer 2-bit field USS-DCI-format to indicate choice between DCI formats: 0_0, 1_0, 0_1, 1_1, the first DCI format, or the second DCI format to be monitored.

Example 64 may include one or more non-transitory, computer-readable media having instructions that, when executed, cause a base station in a new radio (NR) system to: receive or cause to receive, an indication of a capability of a user equipment (UE) to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format is different from DCI formats 1_0 or 1_1, and the second DCI format is different from DCI formats 0_0 or 0_1; determine search spaces for the UE to monitor physical downlink control channel (PDCCH) candidates to obtain DCI formats indicated by the base station; and select a DCI formats from the first DCI format, the second DCI format, the DCI format 1_0, the DCI format 1_1, the DCI format 0_0, or the DCI format 0_1, the DCI formats to be indicated to the UE; and transmit, to the UE, the selected DCI formats.

Example 65 may include the one or more non-transitory, computer-readable media of example 64 and/or some other examples herein, wherein the selected DCI formats are transmitted to the UE by a PDCCH candidate that includes an associated cyclic redundancy code (CRC) scrambled with Cell Radio Network Temporary Identifier (C-RNTI), Configured Scheduling (CS)-RNTI, or other configurable RNTI.

Example 66 may include the one or more non-transitory, computer-readable media of example 65 and/or some other examples herein, wherein the search spaces for monitoring PDCCH candidates are UE-specific search space (USS), which are conveyed to the UE by a higher layer 2-bit field USS-DCI-format to indicate choice between DCI formats: 0_0, 1_0, 0_1, 1_1, the first DCI format, or the second DCI format to be monitored.

Example 67 may include the one or more non-transitory, computer-readable media of example 64 and/or some other examples herein, wherein the first DCI format or the second DCI format has a field to indicate a frequency domain resource assignment or a time domain resource assignment.

Example 68 may include an apparatus comprising means to perform one or more elements of a method described in or related to any of examples 1-67, or any other method or process described herein.

Example 69 may include one or more non-transitory computer-readable media comprising instructions to cause an electronic device, upon execution of the instructions by one or more processors of the electronic device, to perform one or more elements of a method described in or related to any of examples 1-67, or any other method or process described herein.

Example 70 may include an apparatus comprising logic, modules, or circuitry to perform one or more elements of a method described in or related to any of examples 1-67, or any other method or process described herein.

Example 71 may include a method, technique, or process as described in or related to any of examples 1-67, or portions or parts thereof.

Example 72 may include an apparatus comprising: one or more processors and one or more computer readable media comprising instructions that, when executed by the one or more processors, cause the one or more processors to perform the method, techniques, or process as described in or related to any of examples 1-67, or portions thereof.

Example 73 may include a signal as described in or related to any of examples 1-67, or portions or parts thereof.

Example 74 may include a signal in a wireless network as shown and described herein.

Example 75 may include a method of communicating in a wireless network as shown and described herein.

Example 76 may include a system for providing wireless communication as shown and described herein.

Example 77 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed, cause a user equipment (UE) in a new radio (NR) system to:
   transmit, to a base station, an indication of a capability of the UE to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format for the DL BWP is different from DCI formats 1_0 and 1_1, and the second DCI format for the UL BWP is different from DCI formats 0_0 and 0_1;
   determine search spaces for monitoring physical downlink control channel (PDCCH) candidates to obtain DCI formats indicated by the base station;
   monitor the search spaces for the PDCCH candidates; and
   detect the indicated DCI formats, wherein the indicated DCI formats are selected from the first DCI format, the second DCI format, the DCI format 1_0, the DCI format 1_1, the DCI format 0_0, or the DCI format 0_1.

2. The one or more non-transitory, computer-readable media of claim 1, wherein the indicated DCI formats by the base station are selected from the DCI format 1_0, the DCI format 1_1, the DCI format 0_0, or the DCI format 0_1, and wherein the instructions, when executed, further cause the UE to interpret fields of the indicated DCI formats differently from fields of the DCI format 1_0, the DCI format 1_1, the DCI format 0_0, or the DCI format 0_1 as specified in Rel-15 NR specifications based on configuration conveyed by a protocol layer.

3. The one or more non-transitory, computer-readable media of claim 1, wherein the indicated DCI formats include the first DCI format and the second DCI format, and wherein the first DCI format and the second DCI format have smaller sizes than the DCI formats 0_0 and 1_0 for corresponding UL BWP and DL BWP, and wherein the first DCI format and the second DCI format have a same size.

4. The one or more non-transitory, computer-readable media of claim 1, wherein the first DCI format has a same size of the DCI format 0_1, and the second DCI format has a same size of the DCI format 1_1.

5. The one or more non-transitory, computer-readable media of claim 1, wherein the first DCI format or the second DCI format has a field not presented in the DCI format 1_0, the DCI format 1_1, the DCI format 0_0, or the DCI format 0_1.

6. The one or more non-transitory, computer-readable media of claim 1, wherein the first DCI format or the second DCI format has a field that is presented in the DCI format 1_0, the DCI format 1_1, the DCI format 0_0, or the DCI format 0_1, and wherein the field in the first DCI format or the second DCI format is of a smaller size than the field presented in the DCI format 1_0, the DCI format 1_1, the DCI format 0_0, or the DCI format 0_1.

7. The one or more non-transitory, computer-readable media of claim 1, wherein the first DCI format or the second DCI format is conveyed to the UE by a PDCCH candidate that includes an associated cyclic redundancy code (CRC) scrambled with a Cell Radio Network Temporary Identifier (C-RNTI), Configured Scheduling (CS)-RNTI, or other configurable RNTI.

8. The one or more non-transitory, computer-readable media of claim 1, wherein the search spaces for monitoring the PDCCH candidates includes a UE-specific search space (USS) or a common search space (CSS).

9. The one or more non-transitory, computer-readable media of claim 8, wherein the search spaces for monitoring the PDCCH candidates are USS, which are conveyed to the UE by a higher layer 2-bit field USS-DCI-format to indicate choice between DCI formats: 0_0, 1_0, 0_1, 1_1, the first DCI format, or the second DCI format to be monitored.

10. The one or more non-transitory, computer-readable media of claim 1, wherein the first DCI format or the second DCI format has a field to indicate a frequency domain resource assignment or a time domain resource assignment.

11. The one or more non-transitory, computer-readable media of claim 10, wherein the frequency domain resource assignment is a Type 1 resource assignment using a granularity of K>1 contiguous-in-frequency physical resource blocks (PRBs).

12. The one or more non-transitory, computer-readable media of claim 11, wherein the value of K is given by a resource block group (RBG) size for the corresponding DL or UL BWP respectively according to one of: RBG configuration 1 or RBG configuration 2.

13. The one or more non-transitory, computer-readable media of claim 10, wherein the time domain resource assignment only uses PDSCH and PUSCH mapping type B for time-domain scheduling when using the first DCI format, or the second DCI format respectively.

14. The one or more non-transitory, computer-readable media of claim 1, wherein the first DCI format or the second DCI format includes a Modulation and coding scheme (MCS) filed of length 3 or 4 bits for scheduling PDSCH or PUSCH.

15. An apparatus for wireless communication, comprising:
processing circuitry to:
transmit, to a base station in a new radio (NR) system, an indication of a capability of a user equipment (UE) to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format for the DL BWP is different from DCI formats 1_0 and 1_1, and the second DCI format for the UL BWP is different from DCI formats 0_0 and 0_1;
determine search spaces for monitoring physical downlink control channel (PDCCH) candidates to obtain DCI formats indicated by the base station;
monitor the search spaces for the PDCCH candidates; and
detect the indicated DCI formats, wherein the indicated DCI formats are selected from the first DCI format, the second DCI format, the DCI format 1_0, the DCI format 1_1, the DCI format 0_0, or the DCI format 0_1; and
memory circuitry coupled to the processing circuitry, the memory circuitry to store the indicated DCI formats.

16. The apparatus of claim 15, wherein the indicated DCI formats by the base station are selected from the DCI format 1_0, the DCI format 1_1, the DCI format 0_0, or the DCI format 0_1, and wherein the processing circuitry is to interpret fields of the indicated DCI formats differently from fields of the DCI format 1_0, the DCI format 1_1, the DCI format 0_0, or the DCI format 0_1 as specified in Rel-15 NR specifications based on configuration conveyed by a protocol layer.

17. The apparatus of claim 15, wherein the indicated DCI formats include the first DCI format and the second DCI format, and wherein the first DCI format and the second DCI format have smaller sizes than the DCI formats 0_0 and 1_0 for corresponding UL BWP and DL BWP, and wherein the first DCI format and the second DCI format have a same size.

18. The apparatus of claim 15, wherein the first DCI format has a same size of the DCI format 0_1, and the second DCI format has a same size of the DCI format 1_1.

19. The apparatus of claim 15, wherein the first DCI format or the second DCI format has a field not presented in the DCI format 1_0, the DCI format 1_1, the DCI format 0_0, or the DCI format 0_1.

20. The apparatus of claim 15, wherein the search spaces for monitoring the PDCCH candidates includes a UE-specific search space (USS) or a common search space (CSS).

21. The apparatus of claim 20, wherein the search spaces for monitoring the PDCCH candidates are USS, which are conveyed to the UE by a higher layer 2-bit field USS-DCI-format to indicate a choice between DCI formats: 0_0, 1_0, 0_1, 1_1, the first DCI format, or the second DCI format to be monitored.

22. One or more non-transitory, computer-readable media having instructions that, when executed, cause a base station in a new radio (NR) system to:

receive or cause to receive, an indication of a capability of a user equipment (UE) to support a first downlink control information (DCI) format for Physical Downlink Shared Channel (PDSCH) reception in a downlink (DL) bandwidth part (BWP) and a second DCI format for scheduling uplink (UL) grants for physical uplink shared channel (PUSCH) transmission in a UL bandwidth part (BWP), wherein the first DCI format for the DL BWP is different from DCI formats 1_0 and 1_1, and the second DCI format for the UL BWP is different from DCI formats 0_0 and 0_1;

determine search spaces for the UE to monitor physical downlink control channel (PDCCH) candidates to obtain DCI formats indicated by the base station;

select DCI formats from the first DCI format, the second DCI format, the DCI format 1_0, the DCI format 1_1, the DCI format 0_0, or the DCI format 0_1, the DCI formats to be indicated to the UE; and transmit, to the UE, the selected DCI formats.

23. The one or more non-transitory, computer-readable media of claim 22, wherein the selected DCI formats are transmitted to the UE by a PDCCH candidate that includes an associated cyclic redundancy code (CRC) scrambled with a Cell Radio Network Temporary Identifier (C-RNTI), Configured Scheduling (CS)-RNTI, or other configurable RNTI.

24. The one or more non-transitory, computer-readable media of claim 23, wherein the search spaces for monitoring the PDCCH candidates are UE-specific search space (USS), which are conveyed to the UE by a higher layer 2-bit field USS-DCI-format to indicate a choice between DCI formats: 0_0, 1_0, 0_1, 1_1, the first DCI format, or the second DCI format to be monitored.

25. The one or more non-transitory, computer-readable media of claim 22, wherein the first DCI format or the second DCI format has a field to indicate a frequency domain resource assignment or a time domain resource assignment.

* * * * *

UNITED STATES PATENT AND TRADEMARK OFFICE
CERTIFICATE OF CORRECTION

Page 1 of 1

PATENT NO. : 11,096,043 B2
APPLICATION NO. : 16/409427
DATED : August 17, 2021
INVENTOR(S) : Debdeep Chatterjee et al.

It is certified that error appears in the above-identified patent and that said Letters Patent is hereby corrected as shown below:

In the Claims

Claim 9, Column 47, Line 44-45 "indicate choice" should read --indicate a choice--.

Claim 17, Column 48, Line 45 "for corresponding" should read --for a corresponding--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*